(12) United States Patent  (10) Patent No.: US 8,219,430 B1
Thompson et al.  (45) Date of Patent: Jul. 10, 2012

(54) RESOURCE MANAGEMENT SYSTEM

(75) Inventors: Robert Thompson, Mukilteo, WA (US); Mark Debelack, Kenmore, WA (US); Tielin Xu, Bothell, WA (US); Morgan Skinner, Kirkland, WA (US); Richard Storms, Monroe, WA (US)

(73) Assignee: Nintendo Co., Ltd., Redmond, WA (US)

( * ) Notice: Subject to any disclaimer, the term of this patent is extended or adjusted under 35 U.S.C. 154(b) by 1737 days.

(21) Appl. No.: 09/723,319

(22) Filed: Nov. 27, 2000

Related U.S. Application Data

(60) Provisional application No. 60/193,248, filed on Mar. 30, 2000.

(51) Int. Cl.
*G06Q 10/00* (2006.01)

(52) U.S. Cl. ............ 705/7.12; 705/7.13; 705/7.14; 705/7.15; 705/7.16

(58) Field of Classification Search .......... 705/8, 9, 705/7.12–16
See application file for complete search history.

(56) References Cited

U.S. PATENT DOCUMENTS

| | | | | |
|---|---|---|---|---|
| 5,325,292 | A | 6/1994 | Crockett | 364/401 |
| 5,600,554 | A * | 2/1997 | Williams | 705/1 |
| 5,634,055 | A | 5/1997 | Barnewall et al. | 707/103 |
| 5,765,140 | A * | 6/1998 | Knudson et al. | 705/9 |
| 5,893,906 | A | 4/1999 | Daffin et al. | 705/28 |
| 5,907,829 | A | 5/1999 | Kida | 705/9 |
| 5,911,134 | A | 6/1999 | Castonguay et al. | 705/9 |
| 6,023,572 | A | 2/2000 | Lautzenheiser et al. | 395/500.23 |
| 6,044,355 | A | 3/2000 | Crockett et al. | 705/8 |
| 6,192,346 | B1 * | 2/2001 | Green | 705/9 |
| 6,356,875 | B1 * | 3/2002 | Green et al. | 705/9 |
| 6,415,259 | B1 * | 7/2002 | Wolfinger et al. | 705/8 |
| 6,587,831 | B1 * | 7/2003 | O'Brien | 705/8 |
| 6,732,079 | B1 * | 5/2004 | Kintner et al. | 705/8 |
| 6,850,895 | B2 * | 2/2005 | Brodersen et al. | 705/9 |
| 6,957,188 | B1 * | 10/2005 | Dellevi et al. | 705/9 |
| 2005/0091098 | A1 * | 4/2005 | Brodersen et al. | 705/8 |

OTHER PUBLICATIONS

"Practical Function Set for Workforce Management", Research Disclosure NNRD413142, Sep. 1, 1998, 3 pages, retrieved from: East, Technical Disclosure Bulletins.*
"National Finance Center-Employee Personal Page Information", www.nfc.usda.gov, Feb. 24, 1999 [retrieved Mar. 5, 2004], pp. 1-1-10, retrieved from: Google.com and archive.org.*
Moseley et al., "Mastering Office 97: Professional Edition", Sybex, 1997, pp. 5-12 and 783-798.*
"Skill-Based Technology—Driving the Future of Customer Service"; PrimeTime Skills, © 1999 Blue Pumpkin Software, Inc. (2 pages).
"eWorkforce Management"; Aspect SeriesFive Multisite Edition. (2 pages).
"Improve Customer Satisfaction Right from your Desktop"; PrimteTime Skill © 1999 Blue Pumpkin Software. (2 pages).

(Continued)

*Primary Examiner* — Beth V Boswell
*Assistant Examiner* — Nadja Chong Cruz
(74) *Attorney, Agent, or Firm* — Nixon & Vanderhye, P.C.

(57) ABSTRACT

A resource management system includes a work plan builder module configured to build work plans for workers. The work plan builder module is configured to allow each worker to specify, for each of a plurality of different time periods, one of a plurality of different activities that the worker plans to perform during that time period. The work plans built by the work plan builder module are stored in a computer-accessible memory.

39 Claims, 21 Drawing Sheets

OTHER PUBLICATIONS

"Marketscope:Workforce Management Software for the Contact Center"; Wendy S. Close & Tom Berg; Gartner, Oct. 1, 2003. (17 pages).
"Interactive Agent"; Aspect SeriesFive © 2000 Aspect Communications Corporation. (2 pages).
"Enhancing Communication throughout Your Center"; PrimeTime Insight, © 2000 Blue Pumpkin Software, Inc. (2 pages).
"Elegantly Managing the Complexities of the Contact Center"; PrimeTime Enterprise, © 2000 Blue Pumpkin Software, Inc. (4 pages).
"Blue Pumpkin Director Professional" Product Brief, © 2000-2004 Blue Pumpkin Software, Inc. (3 pages).
"Blue Pumpkin Director Enterprise" Product Brief, © 2000-2004 Blue Pumpkin Software, Inc. (3 pages).
"Additional Features and Benefits" Aspect eWorkforce Management. (2 pages).
"Aspect eSchedule Planner"; Aspect eWorkforce Management; © 2003 Aspect Communications Corporation. (4 pages).
"Blue Pumpkin Activity Manager" Product Brief, © 2003-2004 Blue Pumpkin Software, Inc. (2 pages).
"Blue Pumpkin Advisor Express" Product Brief, © 2003-2004 Blue Pumpkin Software, Inc. (2 pages).
"Workforce Management" Solution Brief, © 2003-2004 Blue Pumpkin Software, Inc. (4 pages).
"Contact Center Performance Benchmarking" Product Brief, © 2003-2004 Blue Pumpkin Software, Inc. (2 pages).

* cited by examiner

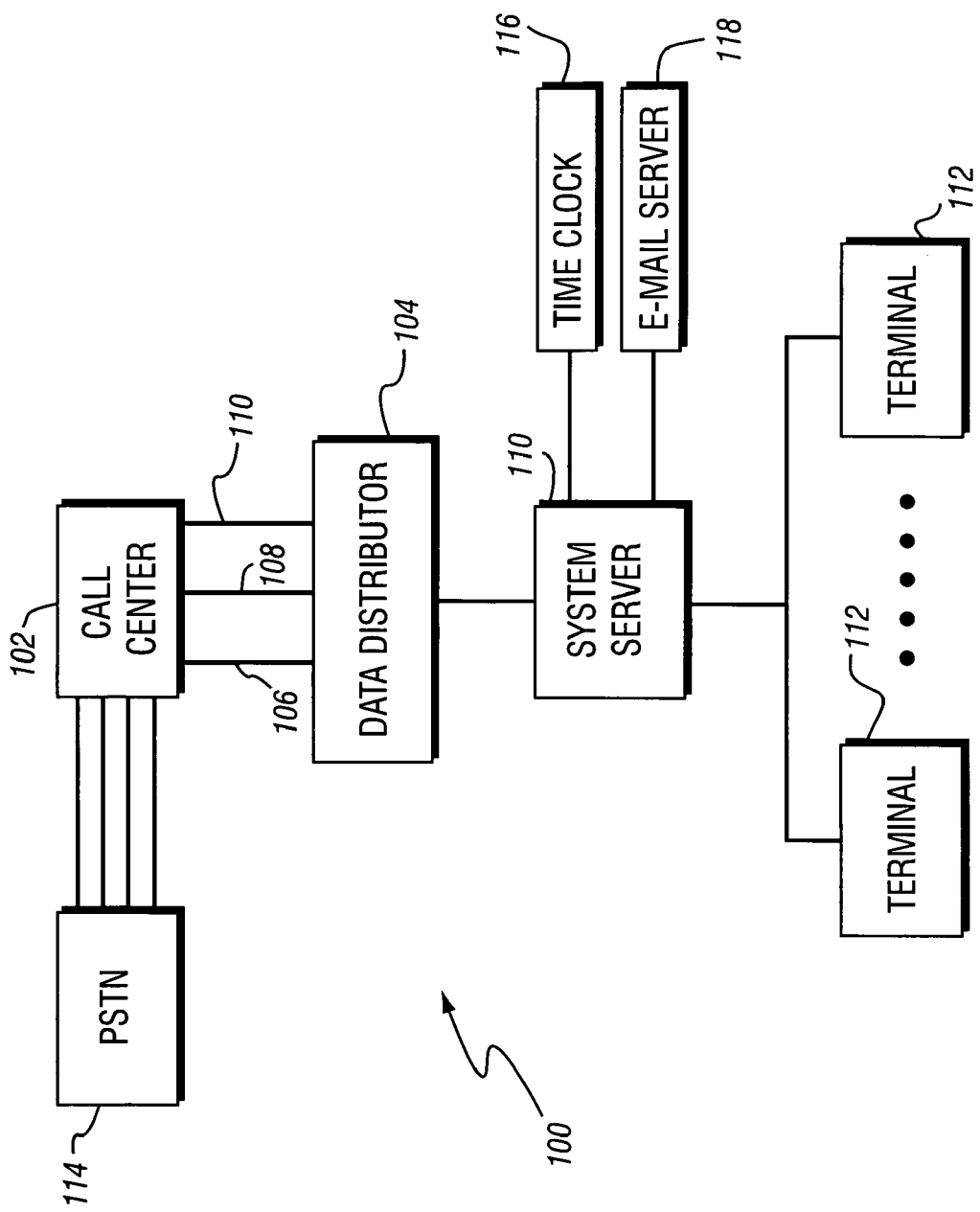

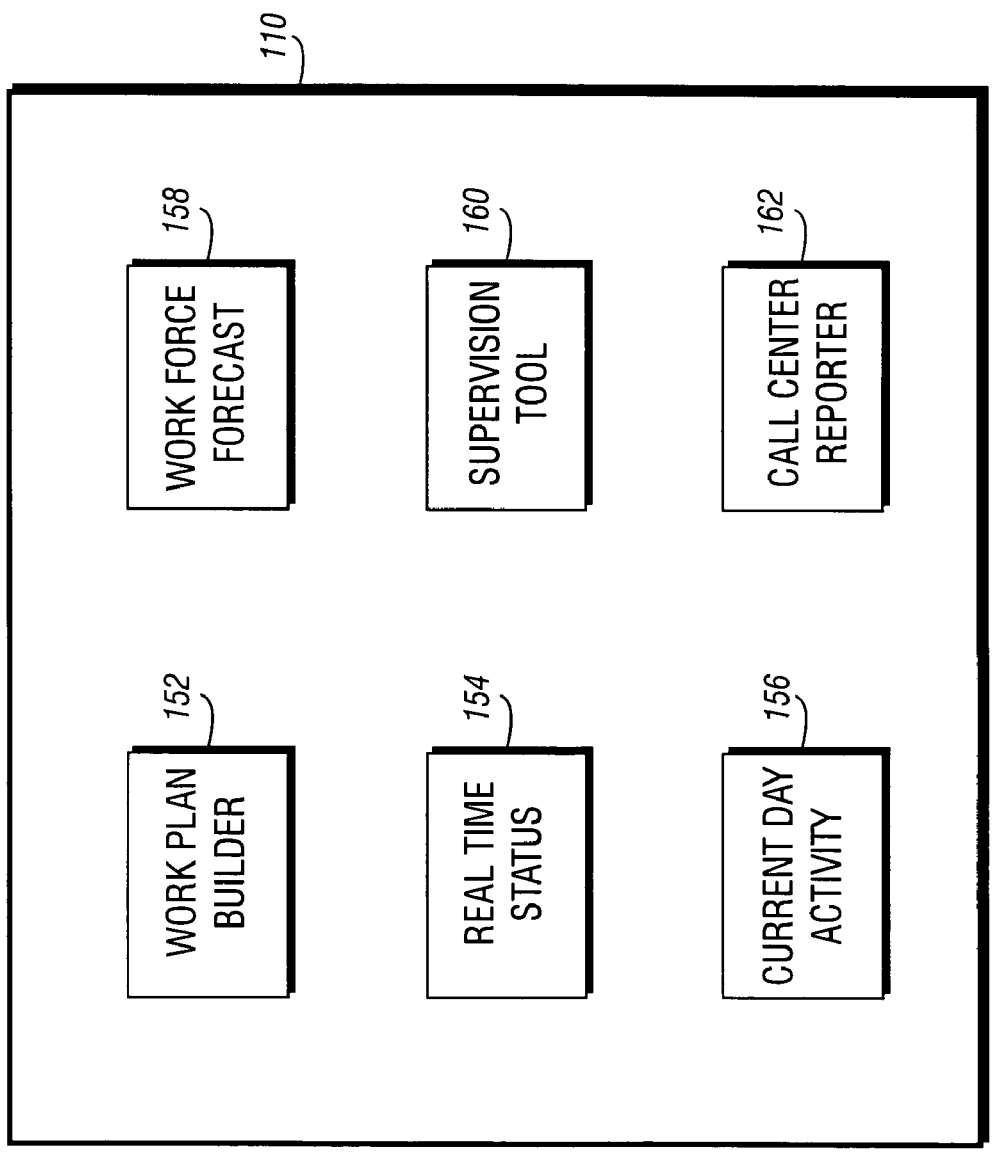

RESOURCE MANAGEMENT SYSTEM

RELATED APPLICATION

This application claims priority from provisional Application No. 60/193,248 filed Mar. 30, 2000, the contents of which are incorporated herein.

TECHNICAL FIELD

The present invention generally relates to a resource management system and, more particularly, to a resource management system that manages worker resources based on factors including work plans input by the workers.

BACKGROUND AND SUMMARY OF THE INVENTION

Companies that sell or distribute products or services typically provide customer service centers to handle inquiries from customers regarding their products or services. These inquiries can be questions regarding how to use or operate a product or can be complaints about product defects. Traditionally, customers have been provided with a telephone number (e.g., a 1-800 telephone number or a 1-900 telephone number) to call with such inquiries. An automatic call distributor (ACD) having software customized for a particular customer service center operation typically handles such telephone calls. The ACD provides call queuing functions and distributes the calls to available customer service representatives or agents. These customer service representatives are trained to respond to inquiries about a company's products or services. When the customer service center receives a large number of calls that might result in long queues and long customer hold times, the ACD may generate a message that informs callers that "All operators are busy. Please call back later." In some circumstances, the ACD may generate a busy signal to incoming calls. Customers are also able to contact companies by regular mail using a customer service mailing address and, more recently, by electronic mail (e-mail) using an e-mail address.

It is very important that a company respond in a timely manner to customer inquiries. Toward this end, businesses generally attempt to ensure that sufficient customer service representatives are available to meet an expected number of customer inquiries. This expected need is determined based on historical data and takes into account seasonal variations (e.g., Christmas season), new product launches, etc. A failure to respond in a timely manner to customer inquiries generally leads to dissatisfied customers and a loss of customer loyalty. As noted above, customer inquiries may be made via different communications channels (e.g., telephone, regular mail, e-mail) and thus companies must ensure that a sufficient number of workers are available to handle inquiries made via each of these channels.

Thus, it is important for a business to have sufficient resources (i.e., customer service representatives) available to handle an expected number of tasks (i.e., customer service inquiries). In the case of telephone inquiries, for example, it is desirable to reduce queue time to reduce telecommunication charges to the company that are associated with calls to the 1-800 numbers of the business and to reduce adverse customer reaction. Of course, it is also desirable not to overstaff a customer service operation since this results in increased operating costs to the company. Thus, companies look to minimize the "available time" of the customer service representatives so that those representatives who are scheduled to be "on-phone" at a given time are actually handling telephone calls.

The resource management system of the present invention is an information system that stores, organizes the variety of staffing data sources, and delivers comprehensive functionality for resource management. The system includes a work plan builder module configured to build work plans for workers. The work plan builder module is configured to allow each worker to specify, for each of a plurality of different time periods, one of a plurality of different activities that the worker plans to perform during that time period. The work plans built by the work plan builder module are stored in a computer-accessible memory.

Such a system provides significant benefits in that it provides workers a degree of autonomy in choosing what they want to do and when they want to do it. The system also makes the workers the data source for work schedules and thereby takes advantage of the fact that the workers themselves are most likely to know what factors (e.g., doctor's appointments, vacation time) will affect their work schedules in the upcoming work period. Management personnel (e.g., team leaders and/or supervisors) are able to review the work plans to determine whether the work plans generated by the workers are sufficient to provide a desired service level for an expected work load. If necessary, the management personnel may reallocate the resources.

Other modules are usable in conjunction with the work plan builder module. A real time status module provides comprehensive statistical information (updated periodically) regarding customer service center operations. A current day activity monitor module provides a real-time comparison between the current real-time requirements and the current period of the work plan. In this way, team leaders, and/or supervisors can be provided with real-time data as to the shortage or surplus of workers. A work force forecast module provides a comparison between the expected work volume and characteristics (as may be determined from algorithms based on historical data and/or seasonal data) and the work plans in order to communicate (e.g., visually) to team leaders, supervisors and/or workers whether sufficient workers are available to achieve the service level goal for the expected tasks. A supervision tool module permits team leads and/or supervisors to view, update and approve the work plans entered by the workers under their supervision or direction. A call center reporter module generates after-the-fact reports that compare the forecasted needs and the workers that planned to handle these forecasted needs with the actual needs and the workers that handled these actual needs.

These and many other advantages of the present invention will be more completely understood and appreciated by careful study of the following more detailed description of illustrative embodiments of the invention taken in conjunction with the accompanying drawings.

BRIEF DESCRIPTION OF THE DRAWINGS

FIG. 1A shows a customer service system 100 in which the resource management system described herein is implemented.

FIG. 1B shows various modules present on system server 110.

DETAILED DESCRIPTION OF EXAMPLE EMBODIMENTS

Figure 2:
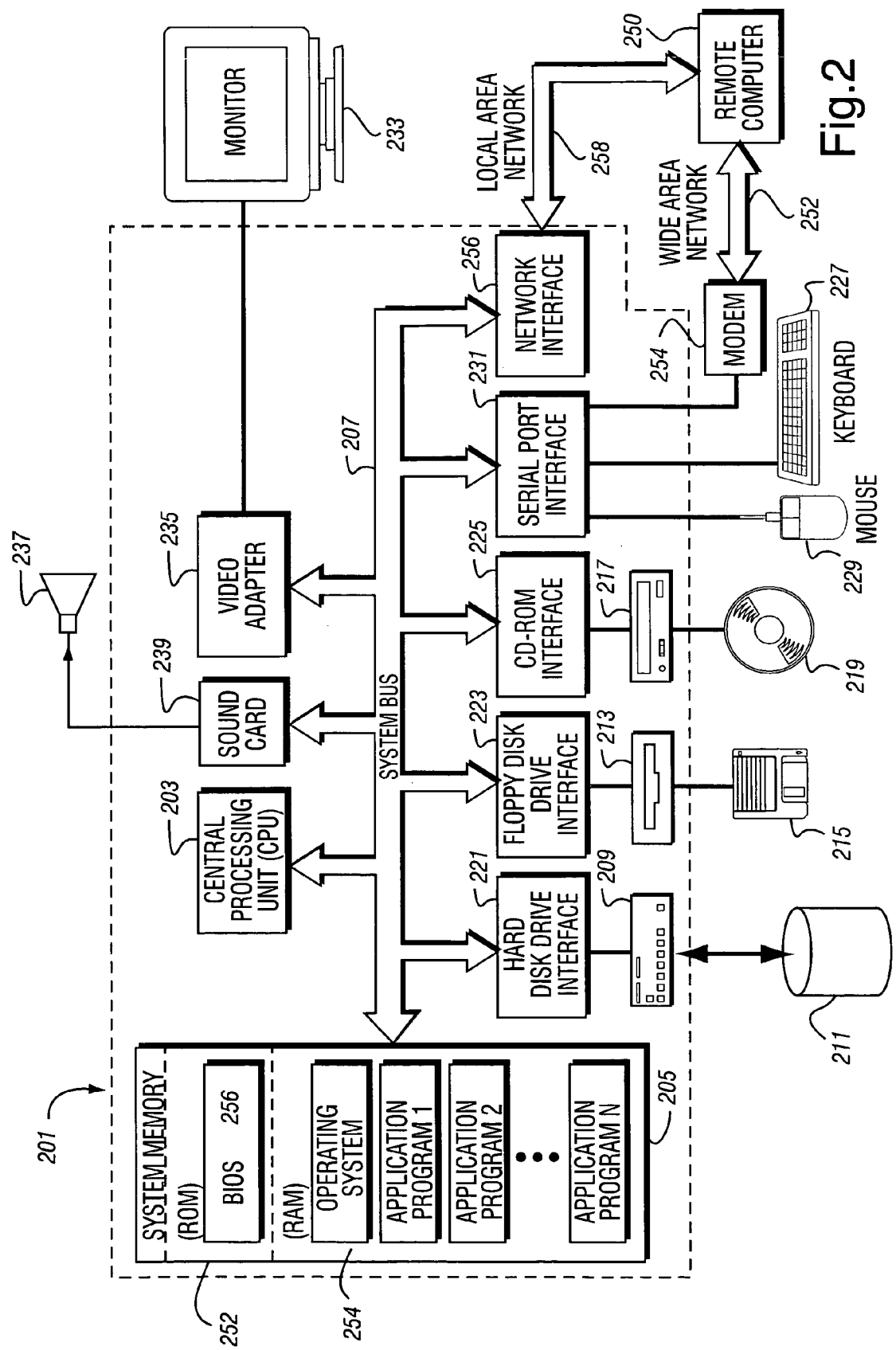
FIG. 2 is a generalized block diagram of a computer system suitable for use as the client and server components shown in FIG. 1.

The present invention is explained below in terms of managing workers in a customer service environment. In the description below, "workers" generally refers to human workers such as customer service representatives. It will be appreciated however that "workers" could in some instances also refer to computer routines for performing certain tasks. That is, certain tasks can be allocated to computer-implemented routines. For example, if customer service telephone lines are overloaded, certain customer services tasks may be allocated to automated routines (e.g., a routine that informs callers "All lines are busy. Please call back later.") "Tasks" as used herein refers to tasks or jobs to be performed by the workers. In the case of a customer service operation, these tasks may include, but are not limited to, handling incoming telephone calls, handling incoming electronic mail and handling incoming regular mail. Finally, the description of the present invention with reference to a customer service environment is for purposes of illustration, not limitation. It will be apparent from the following discussion that the teachings of the present application are applicable to other environments in which workers perform tasks.

FIG. 1A shows a customer service system 100 in which the resource management system described herein is implemented. Call center system 100 includes a call center 102 such as an automated call distributor (ACD) that is connected to a data distributor 104 by an application bridge 106, a real time bridge 108, and a database bridge 110. Data distributor 104 is coupled to a system server 110 which is itself coupled to a plurality of remote worker terminals 112. ACD 102 receives incoming telephone calls from customers over a public switched telephone network 114. Those in the art will appreciate that an ACD may also be configured to handle facsimiles, electronic mail, network (e.g., Internet) communications, and the like. A routing vector routes each of the external phone calls to a selected application and the application then directs each of the calls supplied thereto to one of a plurality of application vectors. Generally speaking, a vector is one or more computer instructions stored in a memory of the ACD and executed by a processor of the ACD for routing incoming telephone calls. The application vectors route the telephone calls from the applications to the customer service representatives. As is well known in the art, the call may be routed based on information supplied from the public switched telephone network, such as the number dialed by the caller or the number of the caller. ACDs are available from various vendors including Aspect Telecommunications Corporation of San Jose, Calif. The functioning of ACDs is well known and will not be described in detail herein. In the resource management system described herein, a network connection is established to ACD 102 and use is made of existing ACD messaging (e.g., Application Bridge, Database Bridge, and Real-Time Bridge).

Data distributor 104 interfaces between ACD 102 and system server 110. Data distributor 104 is a Windows NT server that is configured to send queries to ACD 102 using TCP/IP. ACD 102 provides responses to these queries to data distributor 104. The data responsive to these queries is routed by data distributor 104 to system server 110. For example, responsive to queries from data distributor 104, ACD 102 sends application statistics via application bridge 106. These application statistics may include, but are not limited to, statistics such as the number of 1-800 calls, the number of 1-900 calls, etc. Database bridge 110 provides access to data that has been written to a hard drive of ACD 102 and real-time bridge 108 provides access to data in RAM of ACD 102. Access to the hard drive and RAM via these bridges is through SQL queries. System server 110 is also connected to an e-mail server 118 and a time clock 116.

The resource management system implemented in the system of FIG. 1A is preferably a browser-based system in which a client program running on computers of the team leaders, supervisors and workers (the web browser) requests information from a server program running on system server 110. System server 110 sends the requested data back to the browser program and the browser program then interprets and displays the data on the computer screen. The process is as follows:

1. The team leader, supervisor or worker runs a web browser client program on his/her computer.
2. The team leader, supervisor or worker connects to the server computer (e.g., via the Internet). Connection to the server computer may be conditioned upon the correct entry of a password as is well known.
3. The team leader, supervisor or worker requests a page from the server computer. The browser sends a message to the server computer that includes the following:
   the transfer protocol (e.g., http://); and
   the address, or Uniform Resource Locator (URL).
4. The server computer receives the request and retrieves the requested page, which is composed, for example, in HTML (Hypertext Markup Language).
5. The server then transmits the requested page to the computer of the team leader, supervisor or worker.
6. The browser program receives the HTML text and displays its interpretation of the requested page.

Thus, the browser program sends requests and receives the data needed to display the HTML page on the computer screen. This includes the HTML file itself plus any graphic, sound and/or video files mentioned in it. Once the data is retrieved, the browser formats the data and displays the data on the computer screen. Helper applications, plug-ins, and enhancements such as Java™ enable the browser, among other things, to play sound and/or display video inserted in the HTML file. The fonts installed on the computer and the display preferences in the browser determine how the text is formatted.

If an action is requested that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the resource management system of the present invention include Netscape® Navigator available from Netscape® Communications Corporation and Internet Explorer available from Microsoft® Corp.

While the above description contemplates that each team leader, supervisor and worker has a computer running a web browser, it will be appreciated that more than one person could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the resource management system described below and illustrated in the accompanying drawings.

FIG. 2 generally illustrates a computer system 201 suitable for use as the client and server components of the resource management system. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 207 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules may be stored on hard disk 211, removable magnetic disk 215, optical disk 219 and/or ROM 252 and/or RAM 254 of system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to processing unit 203 through a serial port interface 231 that is coupled to system bus 207, but may be connected by other interfaces, such as a parallel port, game port, Fire wire bus, or a universal serial bus (USB). A monitor 233 or other type of display device is also connected to system bus 207 via an interface, such as a video adapter 235.

Computer system 201 may also include a modem 254 or other means for establishing communications over wide area network 252, such as the Internet. Modem 254, which may be internal or external, is connected to system bus 207 via serial port interface 231. A network interface 256 may also be provided for allowing computer system 201 to communicate with a remote computing device 250 via a local area network 258 (or such communication may be via wide area network 252 or other communications path such as dial-up or other communications means). Computer system 201 will typically include other peripheral output devices, such as printers and other standard peripheral devices.

Other types of computer systems including workstations, hand-held computer systems, personal digital assistants, and interactive wireless communication devices may be used in the resource management system described herein.

The various system modules making up the resource management system of the present invention are present on server 110 of FIG. 1A. With reference to FIG. 1B, these modules include Work Plan Builder module 152; Real Time Status module 154; Current Day Activity Monitor 156; Work Force Forecast module 158; Supervision Tool module 160; and Call Center Reporter module 162. Each of these modules will be described in detail below. While the resource management system of the present invention achieves certain benefits as a result of the interaction of all of these modules with each other, certain advantages can be achieved if less than all or, in some cases, even one, of these modules are utilized.

Figure 3:
FIG. 3 illustrates a main menu screen for the resource management system of the present invention.

FIG. 3 shows the main menu screen of the resource management system. Using this main menu, a worker, team leader and/or supervisor can access the various system modules. As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used and the invention is not limited in this respect.

Work Plan Builder module 152 establishes work plans for workers and constitutes a daily, weekly, bi-weekly, monthly, etc. pre-planning tool used by workers to enter their work plans for an upcoming work period (such as a week or bi-week). Team leaders and/or supervisors are able to make adjustments (or suggest that the workers themselves make adjustments) in one or more work plans if, for example, the work plans entered by the workers for the upcoming work period would not enable a particular service level goal to be reached.

Work Plan Builder module 152 generates a collection of workers' schedules including worker-specified details about how they desire to spend their work time. These work plans are the data foundation for other ones of the system modules as explained in greater detail below. The completed work plans are stored in ORACLE® database tables in the memory of the system server 110. Other database tables may be used and the invention is not limited in this respect. Each worker is required to complete a work plan for an upcoming work period. Work Plan Builder module 152 is configured to set a deadline time by which all work plans for the upcoming work period must be completed. For example, in the case of a weekly work plan, module 152 may be configured to establish close-of-business each Thursday as the deadline for entering work plans for the next week. If a worker does not enter a work plan by this deadline, module 152 is configured to generate an e-mail message to that effect and forward the message to the worker and, preferably, also to the worker's team leader and/or supervisor. Using Supervision Tool module 160 described in greater detail below, team leaders and/or supervisors may be provided with the capability of entering work plans for workers under their direction or supervision if the workers do not or cannot enter the plans themselves, perhaps because of an unexpected absence or illness.

The work plans entered by workers are stored in a memory of the system server 110. Each worker can access his/her work plan from this memory using the interface described below for purposes of review and/or updating. Generally speaking, workers are not able to access work plans of their co-workers. However, as noted above, team leaders and/or supervisors are able to access and/or edit the work plans for the workers under their direction or supervision using Supervision Tool module 160.

A simple and straightforward user interface for Work Plan Builder module 152 will be described with reference to FIGS. 4, 5 and 6. Using this or a similar interface, each worker should be able to complete a work plan for an upcoming work period quickly and easily. By selecting Work Plan Builder from the main menu shown in FIG. 3, the worker is presented with the screen shown in FIG. 4. This screen provides the worker the options to access a "Work Plan" facility by selecting menu choice 402; to access a "Work Plan Profile" facility by selecting menu choice 404; or to return home to the main menu shown in FIG. 3 by selecting menu choice 406. Other system modules are accessible using menu area 408. Menu selections may be made by pointing-and-clicking using a mouse or other pointing device or by pressing appropriate keys on a keyboard. Selecting menu choice 404 ("Work Plan Profile") takes the user to the screen shown in FIG. 5. A work plan profile is the default version of a worker's work plan that is accessible when a worker uses the resource management system to enter a new work plan as will be described in greater detail below. Work Plan Builder module 152 is configured so that the very first time a particular worker accesses the resource management system to enter a work plan, the worker will start the work plan entry process by entering a work plan profile. As noted, the work plan profile constitutes the default version of a worker's work plan when he/she creates a new work plan. Thus, it is desirable for each worker to create a work plan profile that represents his/her "typical" work schedule.

Figure 5:
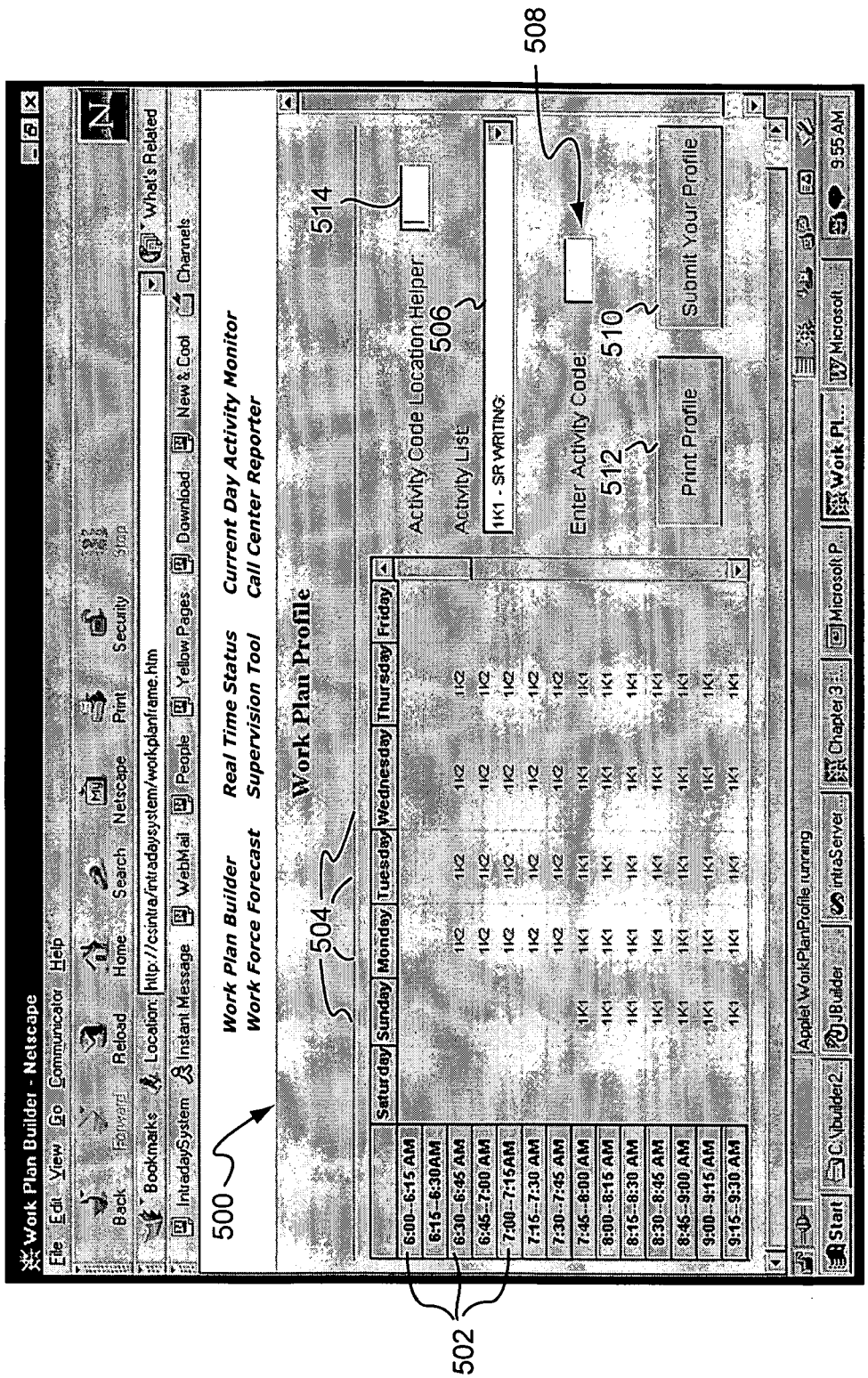

As shown in FIG. 5, work plan profile 500 includes cells arranged in rows and columns. The rows 502 represent work hours broken down into fifteen-minute increments and the columns 504 represent days of the week. Of course, the work hours may be broken down by time increments other than fifteen minutes. In some instances, it may be desirable to break down certain work hour periods into first increments and other work hour periods into second (and even third, fourth, etc.) different increments. That is, for example, some work hour periods may be broken down into fifteen-minute increments, while other work hour periods may be broken down into thirty-minute increments.

The worker begins to enter a work plan profile by highlighting those cells of the row and column display (i.e., times and days of the week) for which it is desired to enter a particular activity. The worker can then go to the "Activity List" combo box 506 to choose an activity code that is indicative of the activity that the worker desires to engage in or perform during the highlighted times and days of the week. Alternatively, a worker can type an activity code into edit field 508. In either case, Work Plan Builder module 152 is configured to fill the chosen (or entered) activity code into the highlighted cells. The above procedure is repeated until the work plan profile is completed. The worker saves his/her work plan profile in the memory of system server 110 by pressing a "Submit Your Profile" button 510. A print-out of the profile is obtained by pressing "Print Profile" button 512. A worker may update his/her work plan profile at any time by accessing the screen shown in FIG. 5 via the appropriate menu selections.

The list of activity codes revealed in combo box 506 corresponds to the possible activities for the worker. For example, in a customer service environment, the list of activity codes may include a first code for preparing written responses to regular mail received from customers, a second code for responding to e-mail received from customers, a third code for responding to telephone calls from customers, a fourth code for vacation, a fifth code for meal times, a sixth code for break times, etc. The codes may be grouped into the following categories: Scheduled On Phone; E-Mail/Letter Contact Time; Changeable Off-Phone (Consumer Service Project Time (such as System Support, Information Database Updating, etc.)); Absence/Lunch/Breaks; and Non-Changeable Off-Phone (Team Meetings, In Training, Retailer Support/Admin. Sched.). This list of activities and grouping of codes are provided by way of illustration, not limitation. Work Plan Builder module 152 may be configured to generate an error message if a worker attempts to select an inappropriate code from combo list box 506 or if the worker enters an inappropriate code into edit field 508. A worker can type in up to three letters in the activity code location helper edit field 514 to receive assistance in finding an appropriate activity code. For example, typing in "S" or "s" will bring the worker to the activity code for "sick" in combo box 506. The worker may then select this activity code from the combo box.

With reference to the portion of the work plan profile shown in FIG. 5, the worker has designated that he/she wishes to perform activity (or task) 1K1-SR writing (i.e., preparing written responses to regular mail received from customers) on Sundays through Thursdays during each fifteen-minute time interval beginning at 7:45 AM and ending at 9:30 AM. The worker has also designated that he/she wishes to perform activity 1K2 (e.g., answering telephone calls from customers) on Mondays through Thursdays during each fifteen-minute time interval beginning at 6:30 AM and ending at 7:45 AM.

Work Plan Builder module 152 may be configured with a number of additional routines to assist a worker in setting up a work plan profile. For example, generally speaking, a worker will be allowed a certain amount of time for meals and/or breaks. If a worker enters too much or too little meal and/or break time, a message such as a pop-up message may be generated to so inform the worker when the worker attempts to save his/her profile by pressing the "Submit Your Profile" button 510. It may also be desirable that workers not work too long without a break. Work Plan Builder module 152 may therefore also generate a message if the work plan profile of a particular worker includes extended time periods (i.e., time periods greater than some predetermined time period) of activity without any breaks. Other help or assistance may be provided to the worker via help screens and/or pop-up messages and dialog boxes.

Figure 4:
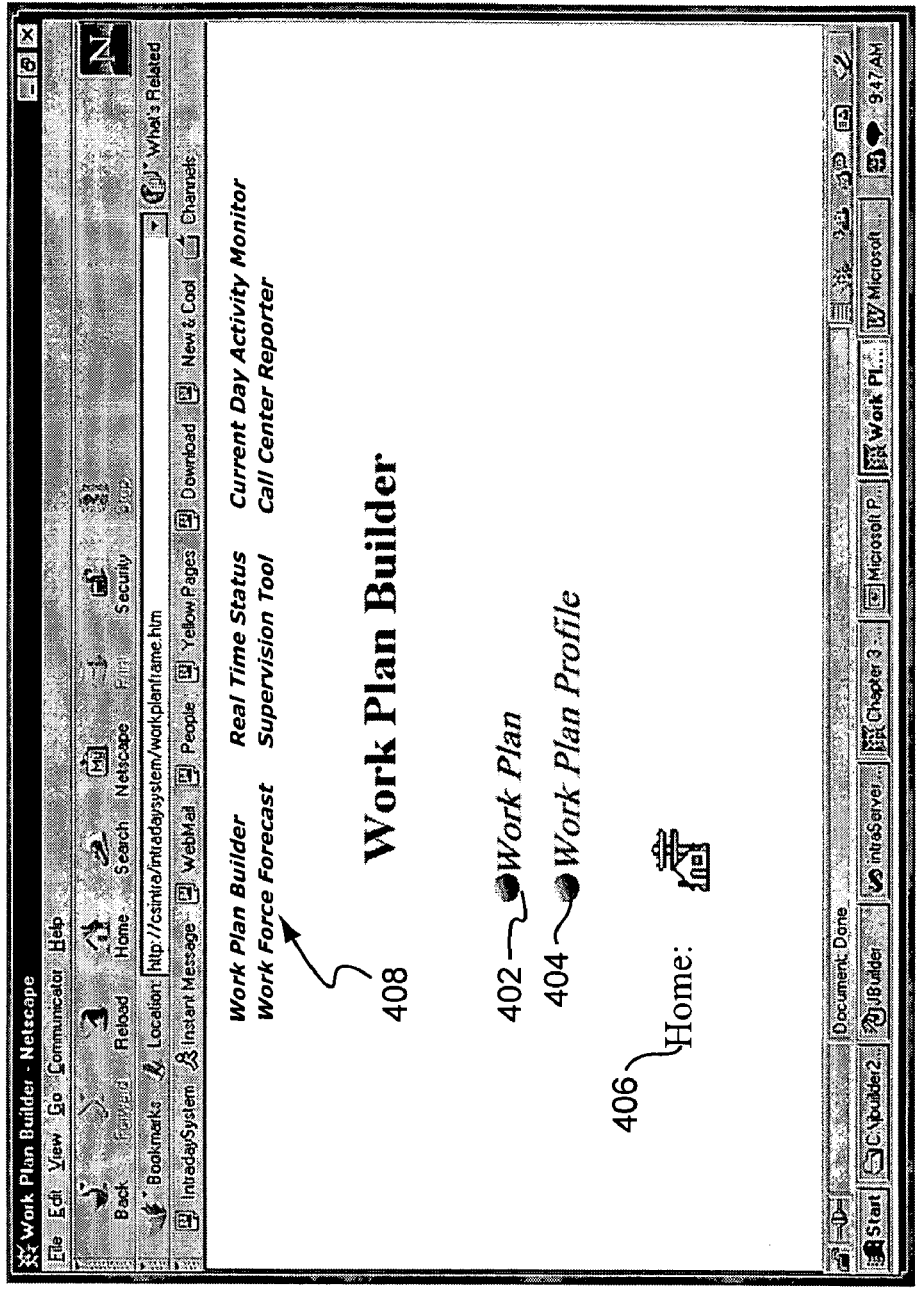
FIGS. 4, 5 and 6 show screens associated with Work Plan Builder module 152.
Figure 6:
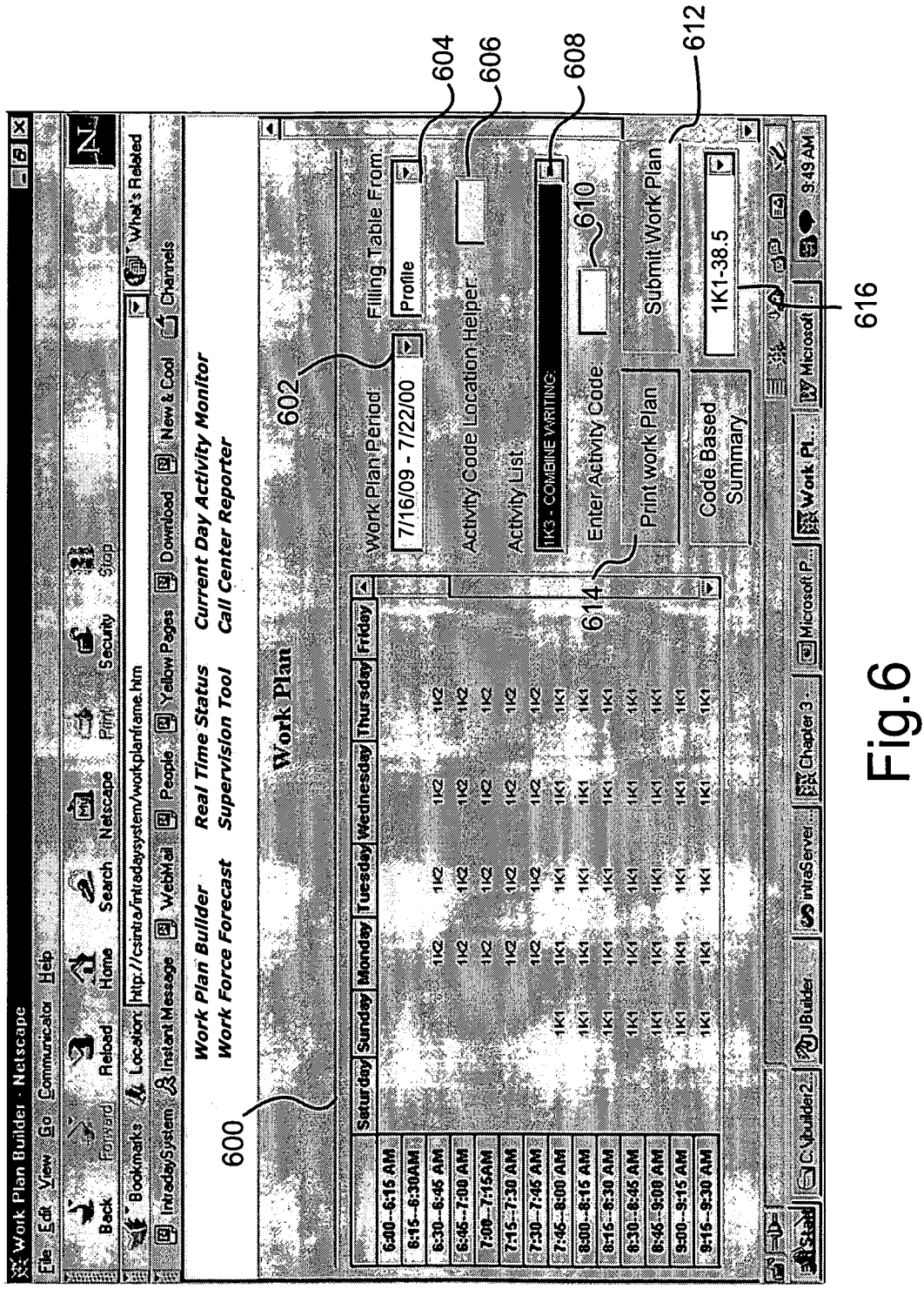

Selecting menu choice 402 ("Work Plan") from the menu shown in FIG. 4 takes the user to the screen shown in FIG. 6. FIG. 6 illustrates a work plan interface that allows each worker to enter his/her work plan 600 for an upcoming work period. In FIG. 6, the worker has chosen the week from Jul. 16, 2000 to Jul. 22, 2000 as the work plan period from the combo box 602. Although FIG. 6 illustrates the upcoming work period as a one-week work period, it will be readily appreciated that the resource management system described herein is not limited in this respect and that other work periods suitable for a particular business operation may be utilized.

The work plan interface of FIG. 6 is configured to allow workers to enter a new work plan or to update an existing work plan for a particular work period and includes a work plan 600 arranged in the same manner as the work plan profile 500 shown in FIG. 5. Combo box 604 allows a user to select a data source for filling in work plan table 600. As shown in combo box 604, work plan table 600 has been filled in using the worker's work plan profile. Other data sources for filling the work plan table may include a work plan for a prior work period or a blank work plan. Like the Work Plan Profile shown in FIG. 5, the work plan interface includes an Activity Code Location Helper edit field 606, an activity list combo box 608, and an Enter Activity Code edit field 610. These edit fields and combo boxes are usable by the worker to select activity codes to enter into the cells of work plan table 600.

To enter a work plan, the worker selects a work plan period using combo box 602 and selects a source to initially fill the cells of the work plan using combo box 604. Combo box 602 may permit the worker to select from among, for example, the current week, the next week, and the week following the next week. The work plan initially filled in using the data source selected by combo box 604 may be modified by highlighting particular cells and then using edit field 606, combo box 608 and/or edit field 610 to choose activity codes that describe the worker's desired activity for the time periods corresponding to the selected cells. A combo box 616 provides an activity code summary that permits workers to see how many hours they have entered in their work plans for each activity code.

The worker saves his/her work plan in the memory of system server 110 by pressing the "Submit Your Work Plan" button 612. The work plan can be printed-out by pressing "Print Work Plan" button 614. A worker may update his/her work plan at any time by accessing the screen shown in FIG. 6 via the appropriate menu selections.

Work Plan Builder module 152 may also include a number of routines to assist a worker in setting up a work plan. These routines may include routines similar to those described above with respect to the work plan profile in connection with meal and/or break time. In addition, a worker is generally allowed a certain amount of vacation time. Work Plan Builder module 152 may be configured to provide messages to workers generating work plans indicating how much vacation time they have used and/or how much vacation time they have left. In addition, for those companies that have a "use it or lose it" policy regarding vacation time, work plan builder module 152 may be configured to give workers an indication of how much of their vacation time must be used by a particular date.

As noted above, the resource management system may be remotely accessed via the Internet or via a dial-up connection. Thus, a sick worker may remotely access and update his/her work plan to indicate that certain time periods will be used as sick time. Here again, a worker is generally allowed a certain amount of sick time and the work plan builder module 152 may be configured to provide messages to workers generating work plans indicative of how much sick time the workers have used, how much sick time remains, etc. Work plan builder module 152 may be configured to provide similar messages with respect to compensatory time.

The work plan interface shown in FIG. 6 may also be modified to include a special message field. The administrator of the resource management system may use this special message field to identify certain anticipated needs and/or to provide incentives for workers to specify certain activities in their work plans. For instance, many workers often schedule vacation time around the holidays (e.g., Thanksgiving, Christmas, etc.). This creates the possibility of understaffing. Understaffing during the holiday season is particularly undesirable for customer service departments of businesses that experience large seasonal sales. These large sales generally result in a significant number of communications from customers either via telephone, e-mail or regular mail. To address this problem, the special message field may identify particular needs and special incentives (extra pay, additional time off, etc.) for those workers who create work plans that address these needs. Thus, for example, the special message field may indicate that those persons who agree to answer telephone calls from customers on Christmas morning will receive a certain financial bonus.

Work Plan Builder module 152 offers significant benefits in that it provides workers a degree of autonomy in choosing what they want to do and when they want to do it. This module makes the workers the data source for work schedules and thereby takes advantage of the fact that the workers themselves are most likely to know what factors (e.g., doctor's appointments, vacation time) will affect their work schedules in the upcoming work period. As will be explained below, team leaders, supervisors, and/or the workers themselves can then determine whether the work plans generated by the workers are sufficient to provide a desired service level for the expected work load. If necessary, resources may be re-allocated.

Figure 7A:
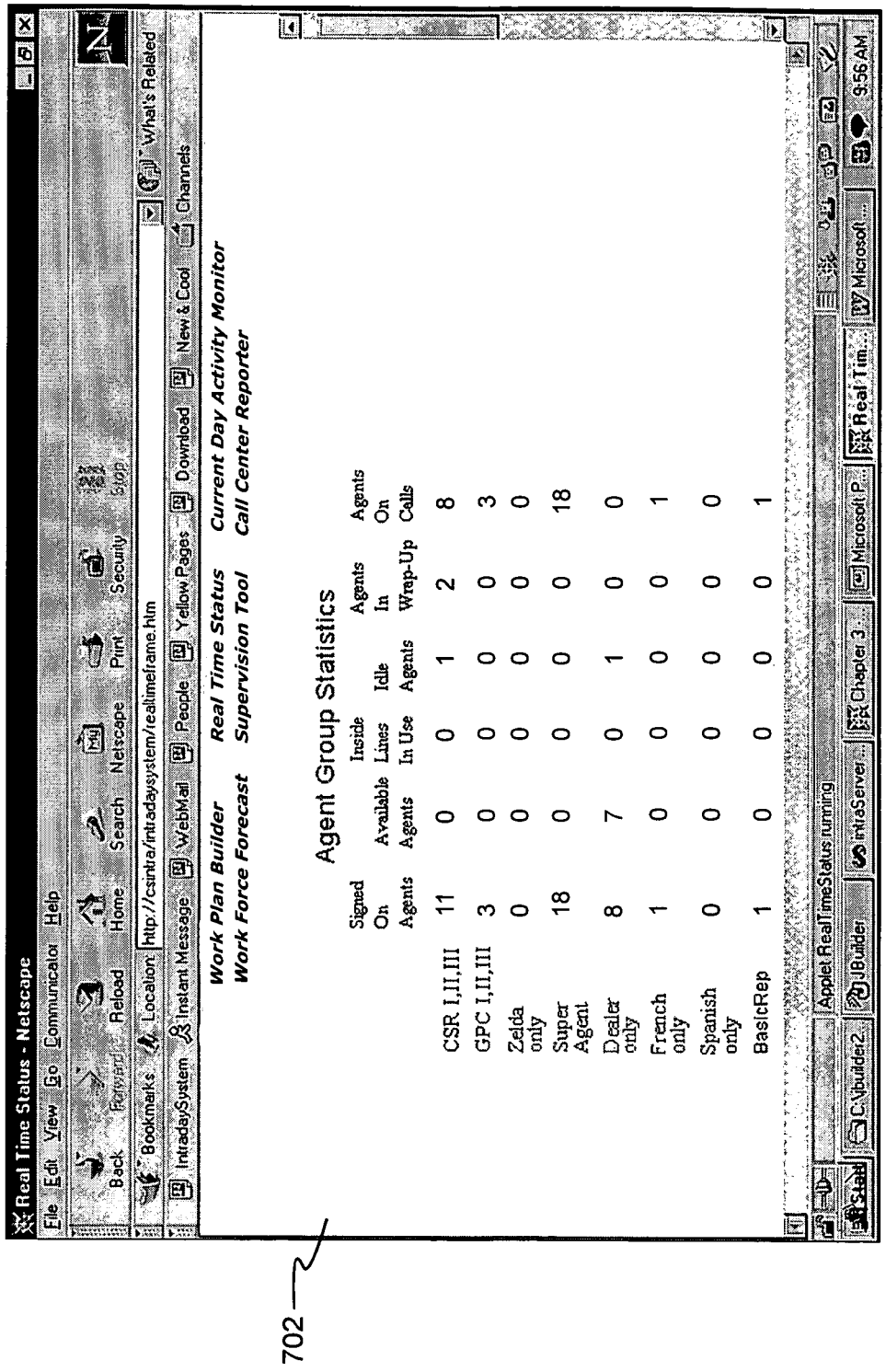
FIGS. 7A-7C show screen portions associated with Real Time Status module 154.
Figure 7B:
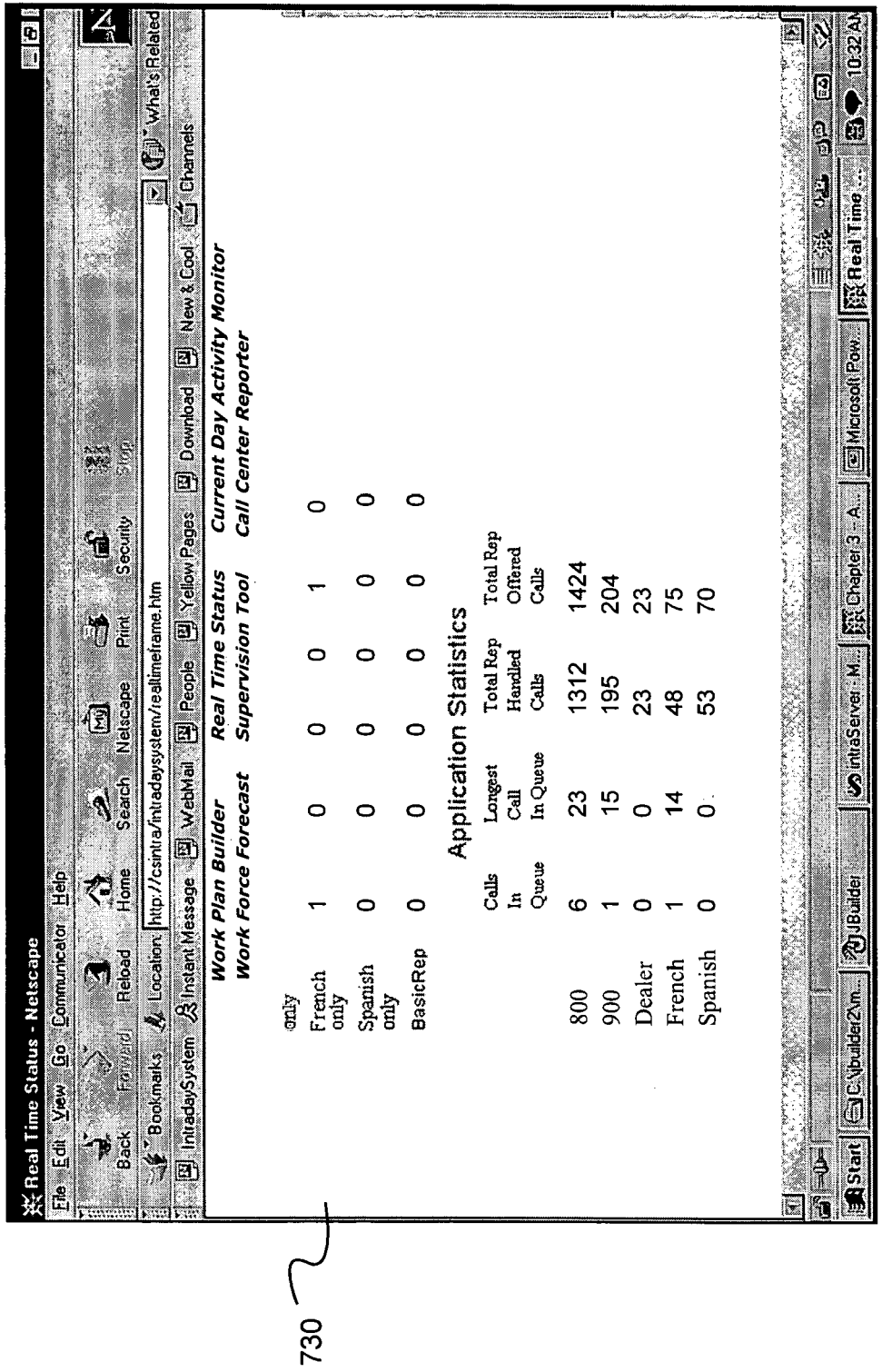
Figure 7C:
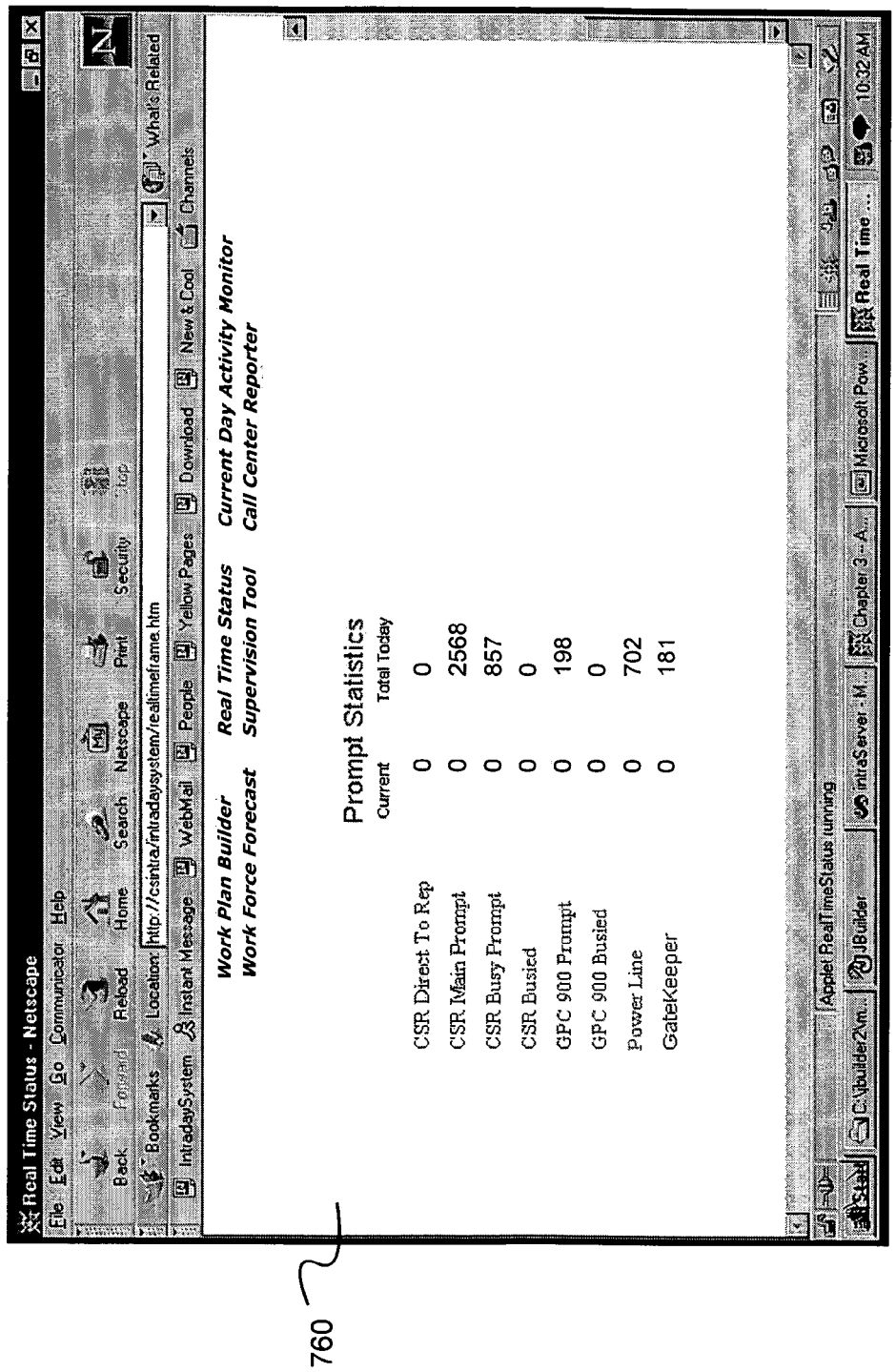

Real Time Status module 154 of the resource management system provides comprehensive statistical information regarding customer service center operations using data from the real-time bridge 108 and ORACLE tables. The statistics are updated periodically (e.g., every five seconds). If the work center is a call center, this statistical information may include agent group statistics, application statistics and prompt statistics. An illustrative real time status screen is shown in FIGS. 7A-7C. This screen is accessible by an appropriate menu selection from the menu shown in FIG. 3. Real Time Status module 154 is configured to provide statistics for various agent groups and FIG. 7A is a first screen portion 702 of the Real Time Status screen showing agent group statistics. In the illustrative screen of FIG. 7A, the following agent groups have been defined: Customer Service Representatives (CSR)—teams I, II, III; Game Play Consultants (GPC)—teams I, II, III; Zelda only agents; "Super" agents; Dealer Only agents; French Only agents; Spanish Only agents; and BasicRep agents. Obviously, these agent groups are provided by way of illustration, not limitation, and it will be apparent that the agents whose status is being monitored can be grouped in any convenient manner. For each group of agents, the following statistics are shown in the screen portion of FIG. 7A: number of signed on agents, the number of available agents, the number of inside lines in use, the number of idle agents, the number of agents in wrap-up and the number of agents on call.

FIG. 7B is a second screen portion 730 of the Real Time Status screen showing application statistics. "Applications" refers to the various call center operations processed by the call center shown in FIG. 1. These operations may include, but are not limited to, "800" or "888" calls; "900" calls; dealer calls; French-language calls; and Spanish language calls. One or more telephone numbers may be associated with each of these operations. The statistics for each of these applications include: the number of calls currently in queue (i.e., the number of calls on-hold); the longest call in queue (i.e., the number of minutes of the longest call on hold); the total number of calls handled by customer service representatives; and the total number of calls offered to representatives.

FIG. 7C is a third screen portion 760 of the Real Time Status screen showing prompt statistics. "Prompts" refers to the prompt heard by callers to the call service center. In some cases, the caller is connected directly to a customer service representative (CSR Direct To Rep). In other cases, the caller hears the main customer service representative prompt (CSR Main Prompt). The main prompt may, for example, include messages that prompt callers to enter certain information in order to appropriately route the call. In still other cases, a busy prompt (e.g., "All lines are currently busy. Please call back later.") (CSR Busy Prompt) may be provided. In still other cases, the caller may call center may simply generate a busy signal for incoming calls (CSR Busied). Other prompts shown in FIG. 7C include a GPC 900 Prompt that is generated for callers to a 900 number for contacting game playing consultants; a GPC 900 Busied in which the system generates a busy signal for incoming calls to the 900 number because, for example, no consultants are available; a Power Line prompt that is generated for certain high-level game players; and a Gatekeeper prompt that discourages certain repeat callers from calling back. The statistics for each of these prompts includes a current number and a total number.

It will of course be recognized that the particular agent groups, agent group statistics, applications, application statistics, prompts, and prompt statistics shown in FIGS. 7A-7C are provided by way of illustration, not limitation. Real Time Status module 154 is preferably configured to generate statistics that are appropriate for the system in which the resource management system of the present invention is implemented.

Current Day Activity Monitor module 156 provides a real-time comparison between the current real-time requirements and the current period of the work plan. This comparison is based on data obtained via real-time bridge 108 and the ORACLE database. In this way, team leaders and/or supervisors can be provided with real-time data as to the shortage or surplus of workers. Current Day Activity Monitor module 156 performs this real-time comparison using information from the work plans stored in the memory of system server 110 and information generated by Real Time Status module 154. Current Day Activity Monitor module 156 may also be configured to process data from worker time clock 116 to provide a verification that those workers whose work plans call for them to be working at a given time are in fact "punched-in" as working.

Current Day Activity Monitor module 156 may be configured to permit team leaders and/or supervisors to re-allocate the resources to meet a shortage or better utilize a surplus. For example, if the displays generated by Current Day Activity Monitor module 156 indicate that more workers are needed to handle incoming telephone phone calls and that there is a surplus of workers handling electronic mail, messages may be generated by a team leader or supervisor to certain workers currently handling electronic mail instructing them to take appropriate steps to begin handling phone calls. Current Day Activity Monitor module 156 may also be configured with a routine that automatically determines when there is a shortage and/or surplus of workers that exceeds some predetermined "acceptable" level and that generates appropriate e-mail messages to workers to address the shortage and/or surplus.

In another implementation contemplated by the inventors, Current Day Activity Monitor module 156 may be configured to automatically generate overtime notifications based on current day situations. For example, if Current Day Activity Monitor module 156 determines that additional workers are needed to handle an unexpected surge in telephone calls on a particular day and/or an unexpectedly high degree of absenteeism, the module may automatically generate and transmit an e-mail message to workers requesting additional workers for a certain time period (e.g., between 7:00 PM and 9:00 PM that evening). Interested workers may respond to the e-mail and the work plans of these interested workers will be automatically updated to reflect this interest. From these updated work plans, Current Day Activity Monitor module 156 will automatically generate updates of the planned on-phone workers. When the anticipated need has been addressed by a sufficient number of workers, module 156 then generates and transmits an e-mail message to the workers indicating that no more overtime workers are needed. While this routine has been described as involving automatic actions by Current Day Activity Monitor module 156, some or all of the actions of this routine (e.g., determination of need for additional workers, generation of e-mails to workers, and updating of workers' work plans) may be performed by team leaders and/or supervisors.

Work Force Forecast module 158 provides a comparison between the expected work volume and characteristics (as may be determined from algorithms based on historical data and/or seasonal data) and the work plans that have been entered in order to communicate (e.g., visually) to team leaders and/or supervisors whether sufficient workers are available to achieve the service level goal for the expected tasks. Work Force Forecast module 158 provides data indicative of the workforce that will be needed for a given period (e.g., the upcoming work week). By viewing a comparison of the workforce needed for a given period and the work plans entered by workers, team leads and supervisors can determine if differences exist between the work force that is forecast to be needed and the work force that is planned to be available. Workers themselves may also be given the capability of reviewing work plans against forecasted needs. In this way, workers can identify coverage problems and initiate their own changes to their workplans. In one implementation, the forecast of the needed work force is generated based on customer service center historical data and industry-accepted algorithms. In some implementations, the forecast of the needed work force may be generated independently of Work Force Forecast module 158 (e.g., by a separate module or program running on system server 110 or by a module or program running on a separate computer) and supplied as an input thereto. In still other implementations, Work Force Forecast module 158 may itself be configured with the appropriate algorithms to generate a forecast of the needed work force.

Work Force Forecast module 158 generates displays based on comparisons that are appropriate for the tasks handled by the workers. For example, Work Force Forecast module 158 may generate displays based on comparisons between the workers' work plans and the forecasted need for workers to handle phone calls, electronic mail and regular mail. As the work plans of the workers change, Work Force Forecast module 158 automatically updates the comparison between the expected telephone call, electronic mail and regular mail volume and the work force that is planned to be available to handle these expected volumes. Again, this module provides team leaders and/or supervisors the ability to re-allocate resources in order to meet the anticipated demand.

Figure 8A:
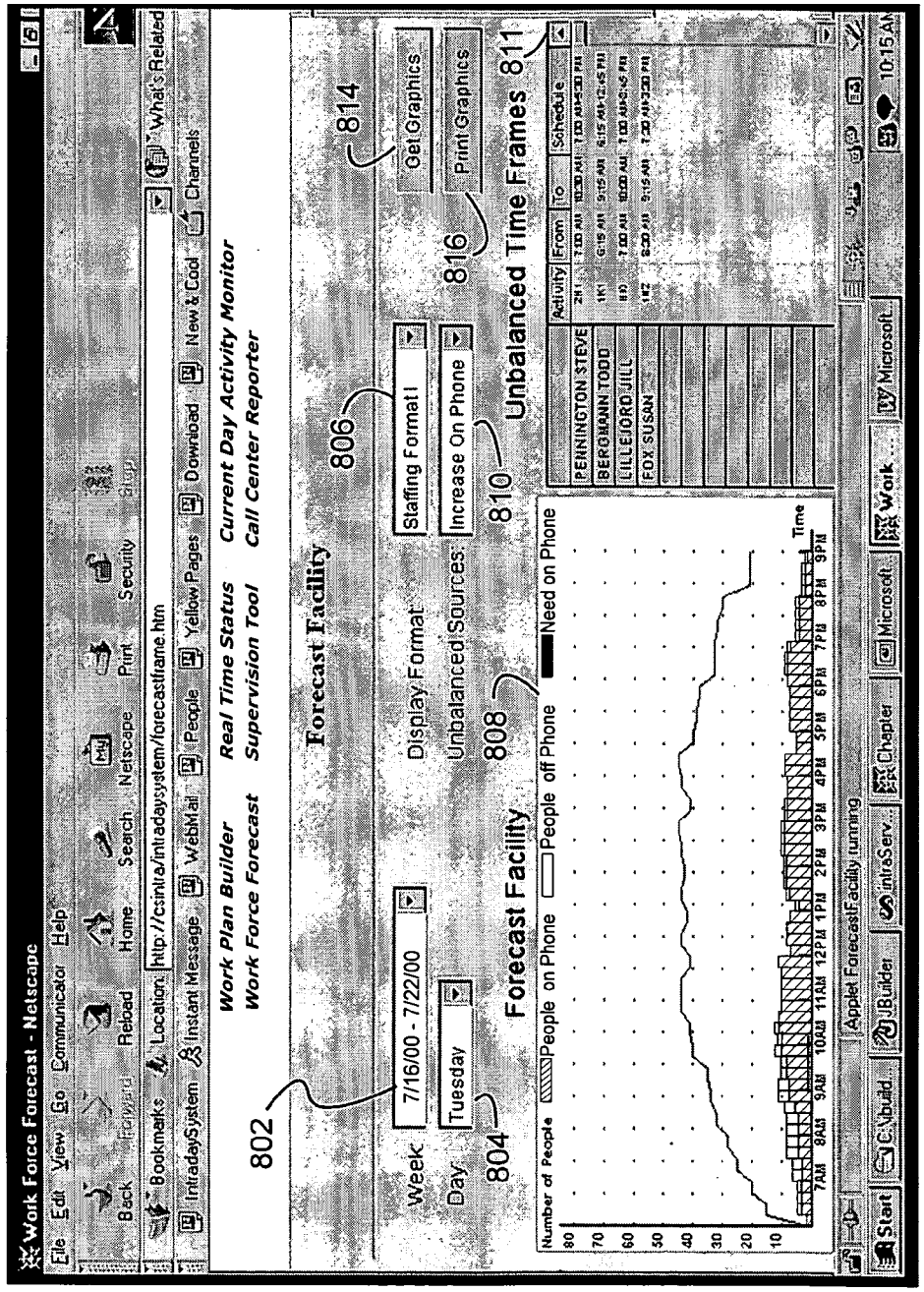
FIGS. 8A and 8B show screens associated with the Work Force Forecast module 158.
Figure 8B:
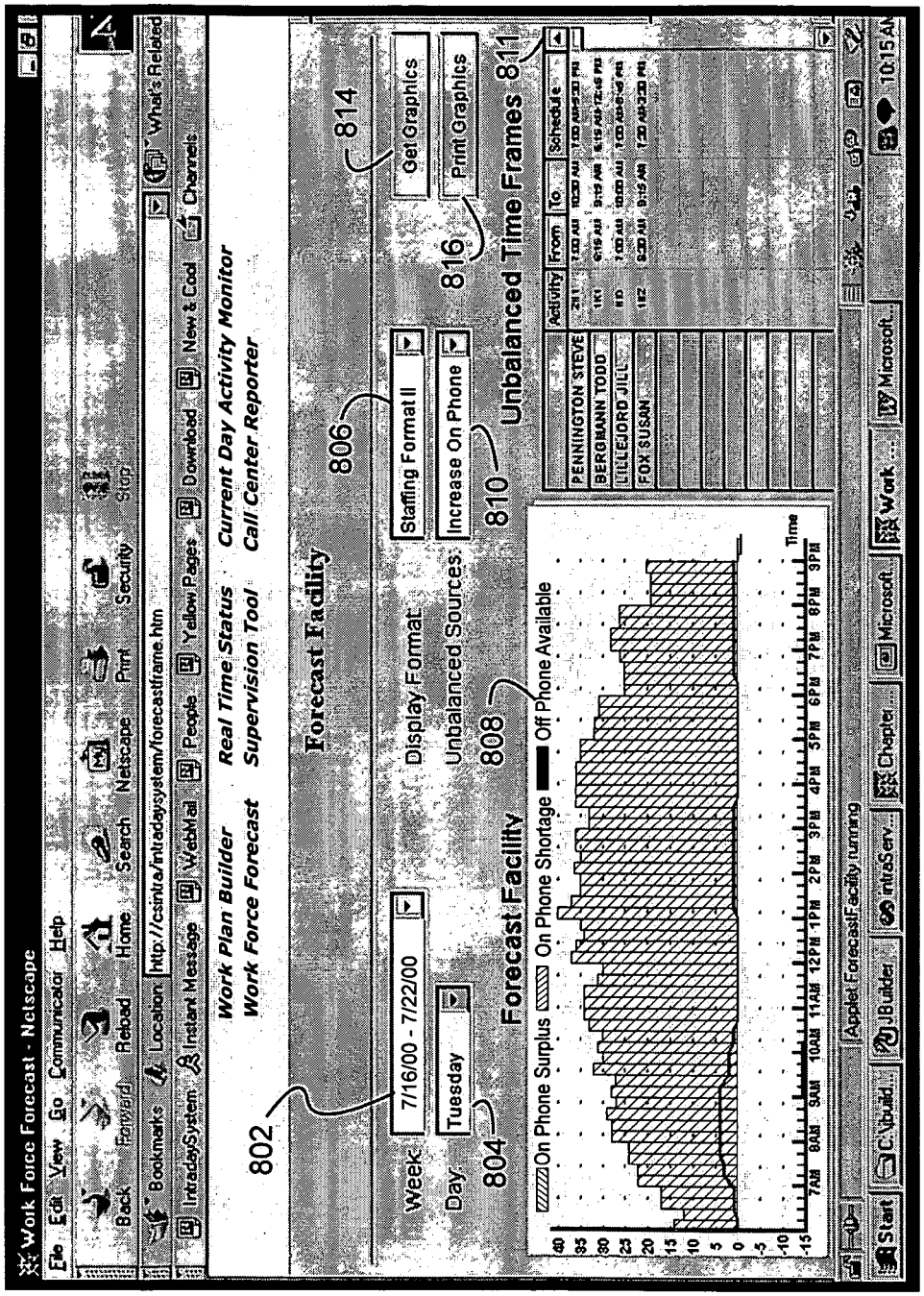

FIGS. 8A and 8B show screens associated with the Work Force Forecast module 158. Generally speaking, the use of Work Force Forecast module 158 is limited to team leaders and/or supervisors. The screens of FIGS. 8A and 8B are accessible by selecting Work Force Forecast from the main menu shown in FIG. 3. The screen of FIG. 8A includes a combo box 802 for selecting a particular work period (e.g., Jul. 16, 2000-Jul. 22, 2000) and a combo box 804 for selecting a particular day of the week (e.g., Tuesday). A combo box 806 allows the user to select a particular display format for the graphical display 808 of staffing data. A combo box 810 allows a user to select a desired staffing change based on the data displayed in graphical display 808. For example, graphical display 808 of FIG. 8A shows that the on phone need for the customer service center significantly exceeds the number of people whose work plans call for them to be on phone on Tuesday of the week of Jul. 16, 2000. By selecting "Increase on Phone" from combo box 810, the user is presented with a list of workers 811 who are working at some particular selected time period (9:00 AM to 10:15 AM in FIG. 8A), but who are not planning to be on phone during this time period. For each worker in the list, his/her planned activity (represented by an activity code); the time he/she plans to perform that activity; and the work schedule (i.e., work hours) are provided. Based on this information, a team leader and/or supervisor may decide to alter the work plan of one or more of the listed workers in order to ensure the availability of sufficient staffing to satisfy a desired service goal. In one implementation, Work Force Forecast module 158 permits the team leader or supervisor to modify a worker's work plan from the screen of FIG. 8A by simply changing the activity code and/or the time that the worker will perform the activity corresponding to that activity code. Thus, in the case of FIG. 8A, the team leader or supervisor may change the activity codes for one or more of the listed workers so that their work plans call for them to be on phone during part or all of the time period of the expected shortage. In another implementation, Work Force Forecast module 158 is configured to permit the team leader or supervisor to select a worker by name (e.g., by pointing-and-clicking) in order to access that worker's work plan with a view similar to the view shown in FIG. 6. After making the desired changes, the team leader or supervisor is returned to the screen of FIG. 8A and is permitted to make changes to other workers' work plans in a similar manner.

"Get Graphics" button 814 may be pressed to generate update graphical display 808 to take into account any changes in the selections made using the combo boxes or in the workers' work plans. "Print Graphics" button 816 may be pressed to generate a hard copy print-out of graphics display 808.

Figure 8C:
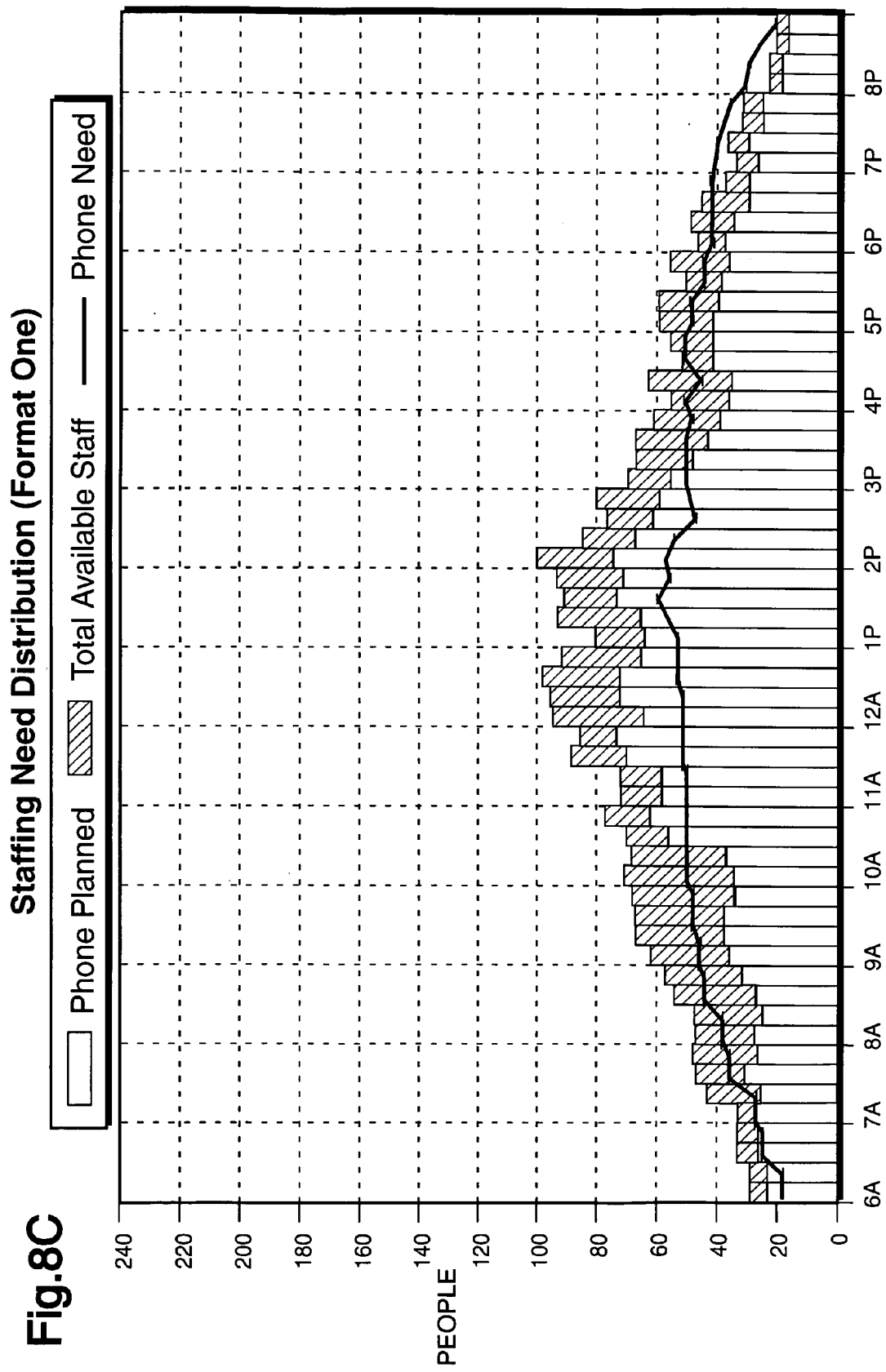
FIGS. 8C and 8D show alternative staffing need distribution display formats.
Figure 8D:
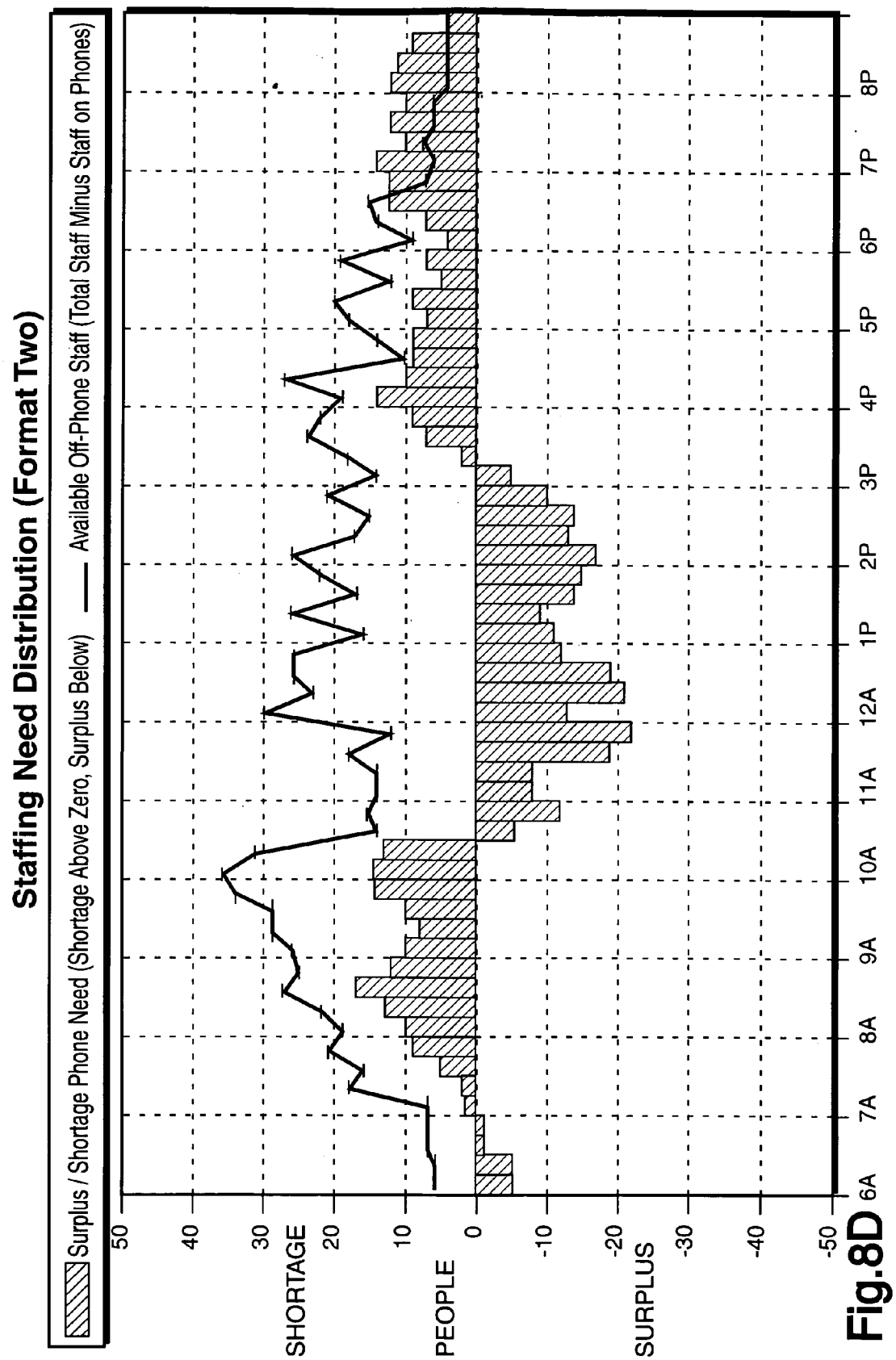

FIG. 8B is similar to FIG. 8A and shows a different display format for the data in graphical display 808. FIGS. 8C and 8D show other alternative formats for displaying staffing need distribution. It will be apparent that other display formats may be utilized and the present invention is not limited in this regard.

Although not required, in those implementations in which Work Force Forecast module 158 is configured to generate forecast data, the module may utilize data generated by Call Center Reporter module 162 to be described below as part of the historical data used to generate the forecasts of expected task volumes. Work Force Forecast module 158 may be made more robust by using algorithms that take into account near real-time and/or real-time data as to the volume of telephone calls, e-mail and regular mail. For example, Work Force Forecast module 158 may be configured to analyze activities during a first portion of a work period to update the forecast for a later portion of the same work period. Similarly, Work Force Forecast module 158 may be configured to analyze activities during one portion of a work day to update the forecast for a later portion of the same work day.

Figure 9:
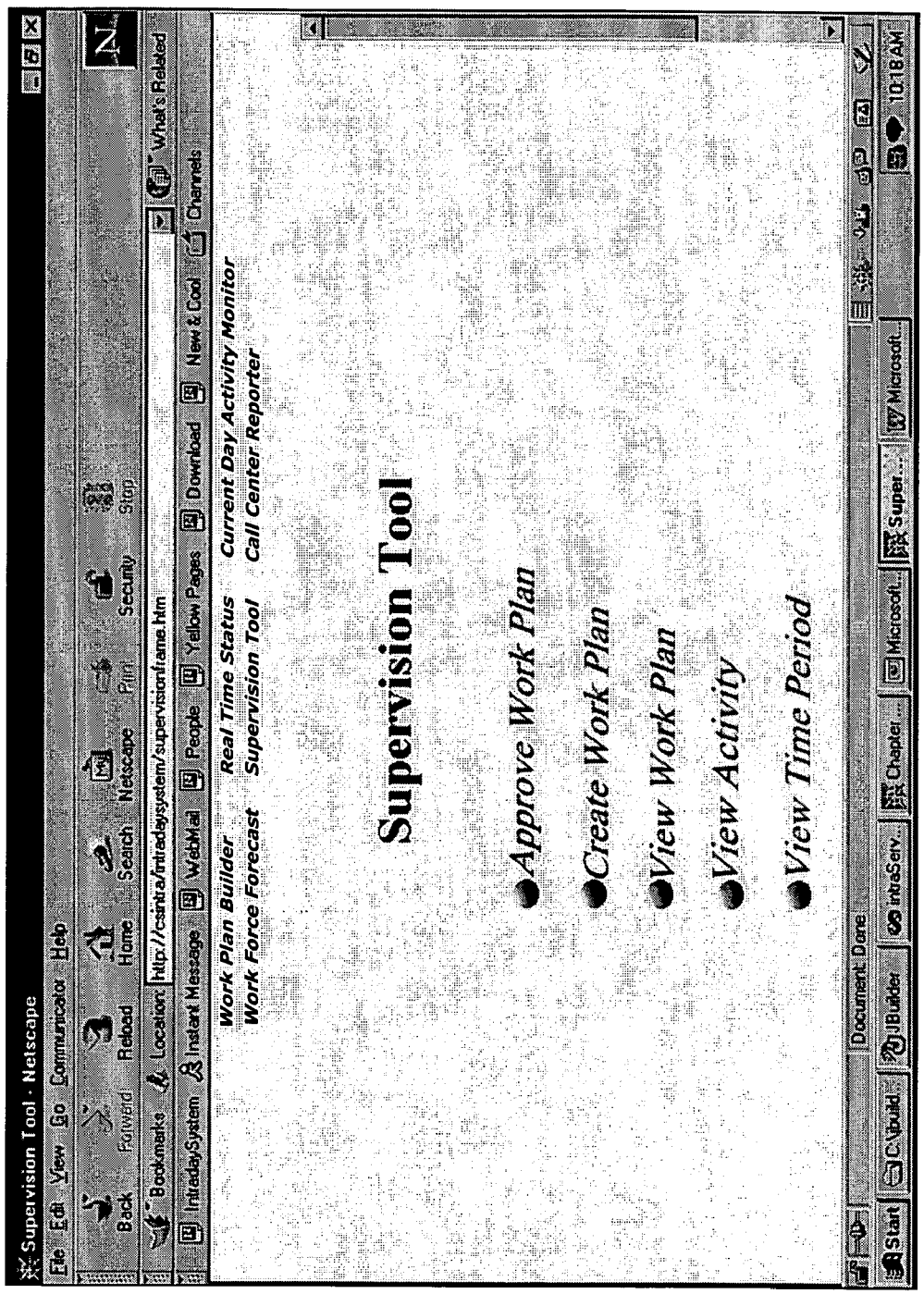
FIG. 9 shows the main menu for Supervision Tool module 160.
Figure 10A:
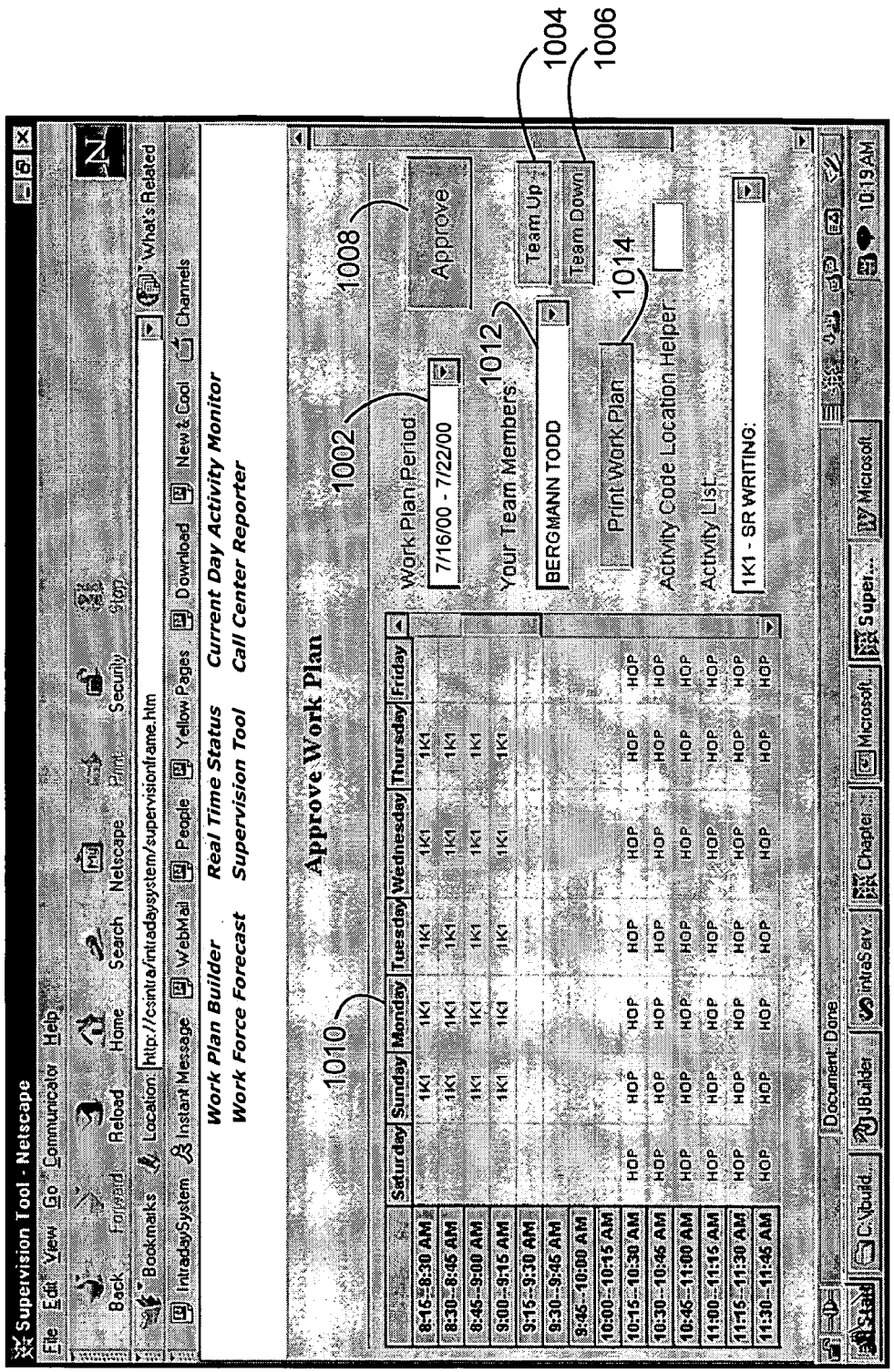
FIGS. 10A-10F show screens associated with Supervision Tool Module 160.

Supervision Tool module 160 permits team leads and/or supervisors to view, update and approve the work plans entered by the workers under their supervision or direction. FIG. 9 shows the main menu for Supervision Tool module 160. This menu is accessible by selecting "Supervision Tool" from the system main menu of FIG. 3. Selecting "Approve Work Plan" from the menu of FIG. 9 causes the screen of FIG. 10A to be displayed. Team leads, managers and supervisors utilize this Approve Work Plan screen to view and approve their team member's work plans. The user of the screen in FIG. 10A selects a work plan period using a combo box 1002. "Team Up" and "Team Down" buttons 1004 and 1006 are usable by team leaders and supervisors to navigate through the work plans 1010 for the team members under their direction or supervision. Work plans for team members identified in combo box 1012 are approved by pressing the "Approve" button 1008. Each work plan record stored in the memory of server computer 110 preferably includes approval identification data that identifies the person that approved that work plan. Work plans may be printing by pressing "Print Work Plan" button 1014.

Figure 10B:
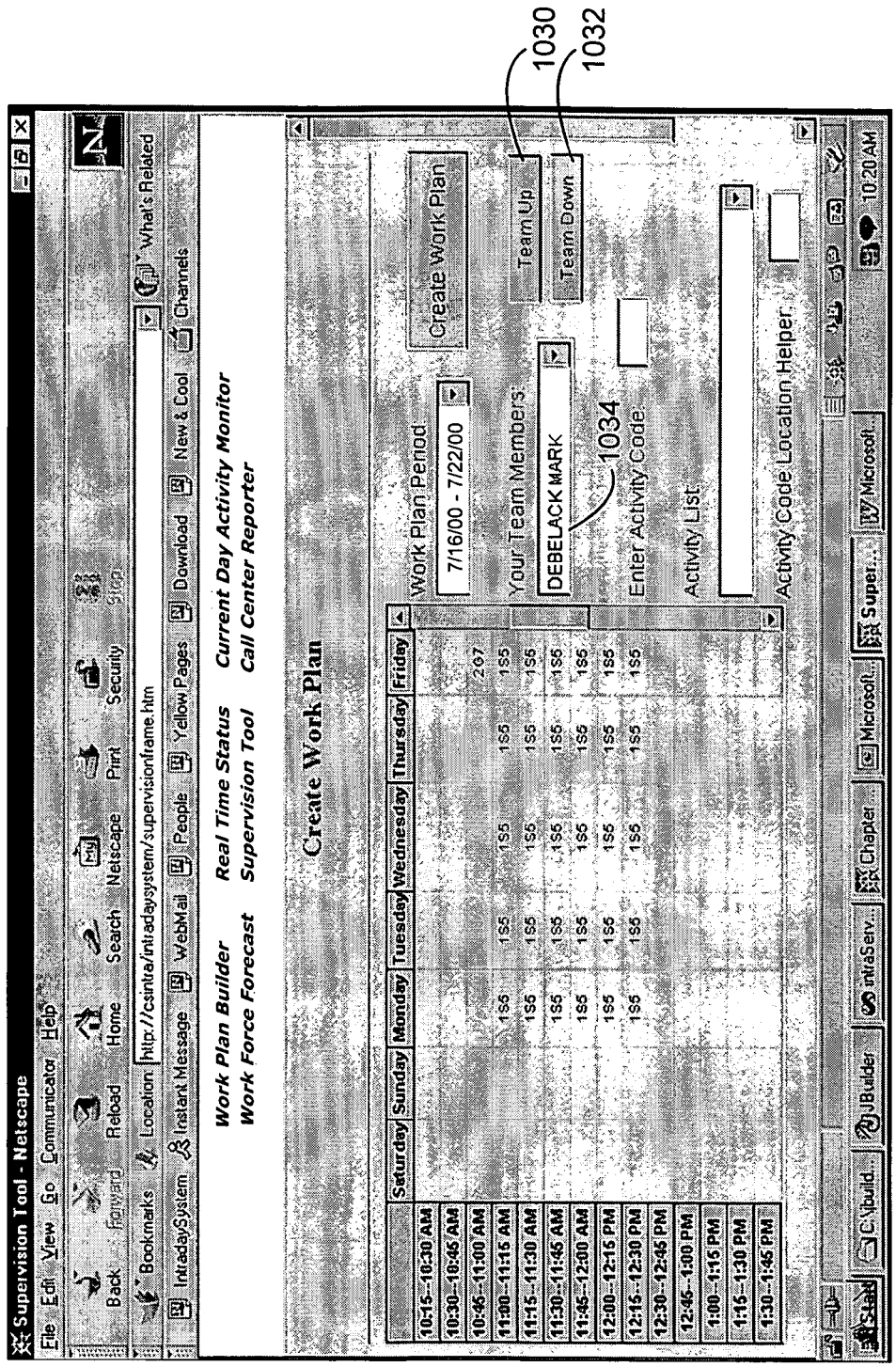

Selecting "Create Work Plan" from the menu of FIG. 9 causes the screen of FIG. 10B to be displayed. Team leads, managers and supervisors sometimes need to create the work plans for some of their team members who may out of the office due to illness, for example. This screen is very similar to the screen of FIG. 10A with "Team Up" and "Team Down" buttons 1030 and 1032 permitting navigation to locate particular team members that are listed in combo box 1034. Each work plan record stored in the memory of server computer 110 preferably includes identification data that identifies the person that created that work plan.

Figure 10C:
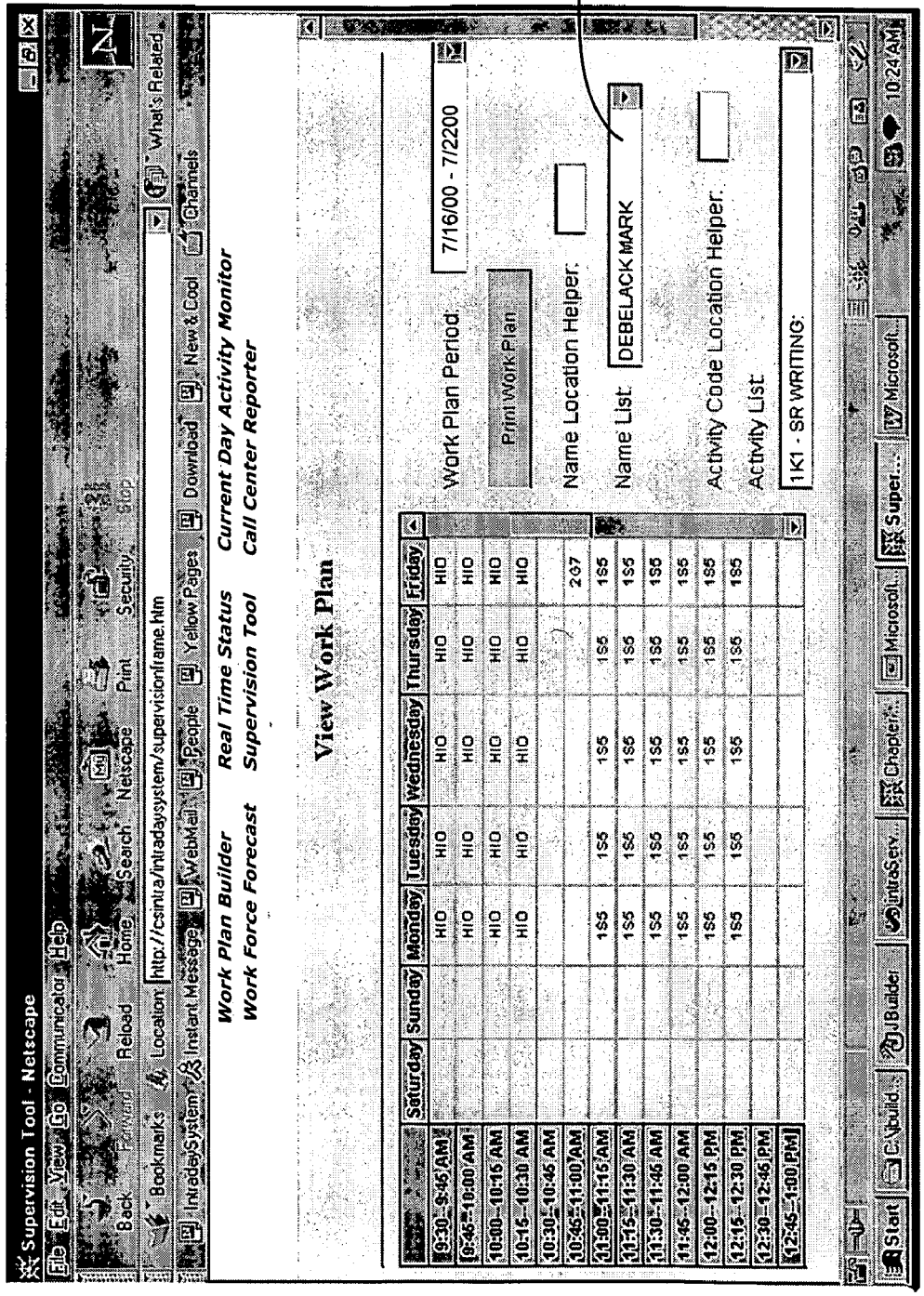

Selecting "View Work Plan" from the menu of FIG. 9 causes the screen of FIG. 10C to be displayed. This screen provides a facility to view the work plan of a particular worker by selecting the name of that worker from combo box 1050.

Figure 10D:
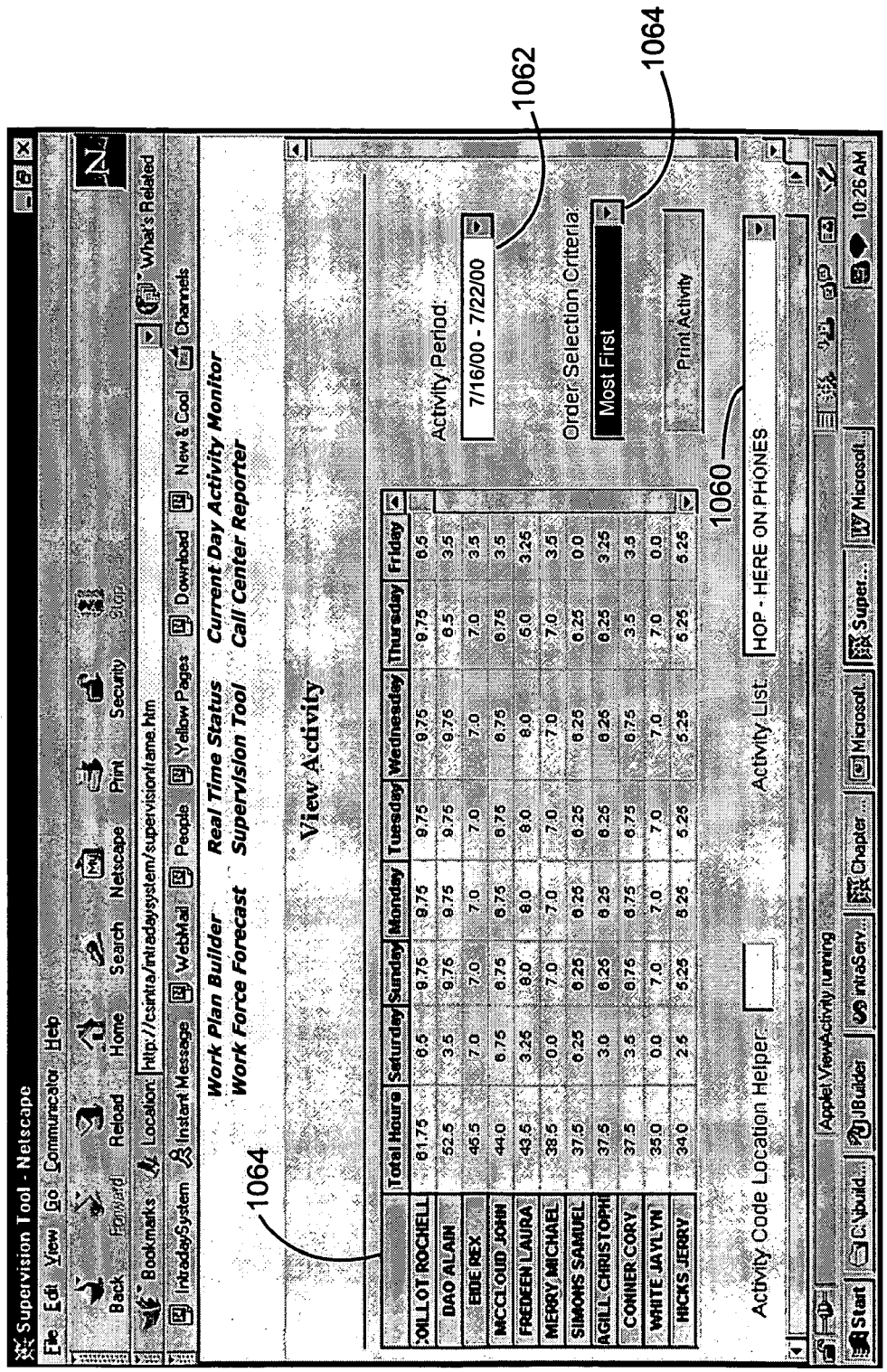
Figure 10E:
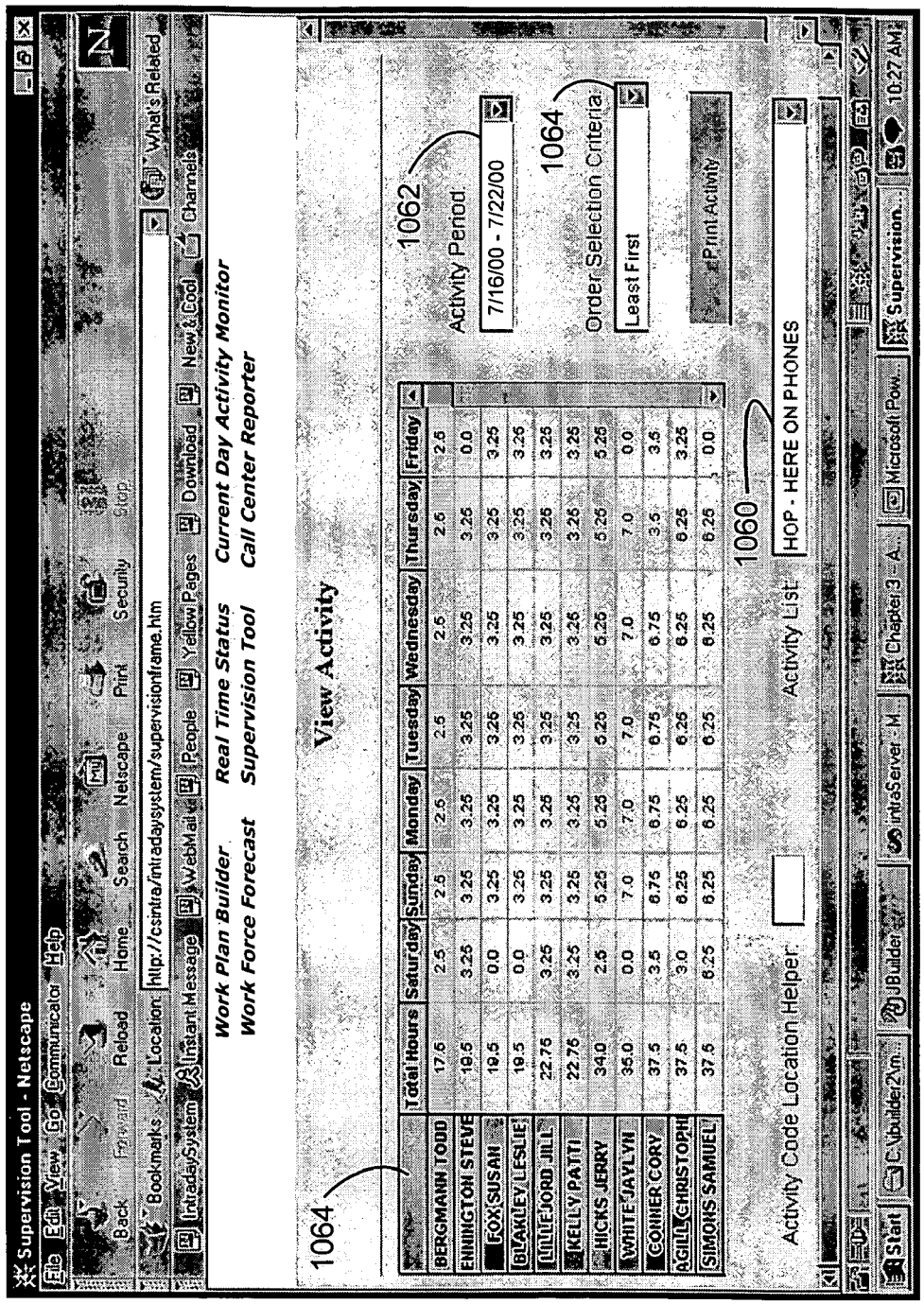

Selecting "View Activity" from the menu of FIG. 9 causes the screen of FIG. 10D to be displayed. This screen provides a facility to view work plan information based on activity codes specified in combo box 1060 for the activity period specified in combo box 1062. More specifically, for the activity specified in combo box 1062, the screen of FIG. 10D shows a list of workers 1064 that specifies the number of hours that each worker plans to spend performing that activity each day during the activity period, as well as the total number of hours that each worker plans to spend performing that activity during the activity period. This tool helps users, among other things, to locate workers for reallocation if there is an unbalanced forecast (e.g., not enough workers planning to be "on-phone" to cover the forecasted need). The screen of FIG. 10D includes a combo box 1064 for selecting the order selection criteria (e.g., most first). In the case of most first, the list of workers begins with the worker who plans to spend the most total hours performing the activity designated in combo box 1060. If the order criteria is changed to "least first", the list of workers begins with the worker who plans to spend the least time performing the activity designated in combo box 1060 as shown in FIG. 10E.

Figure 10F:
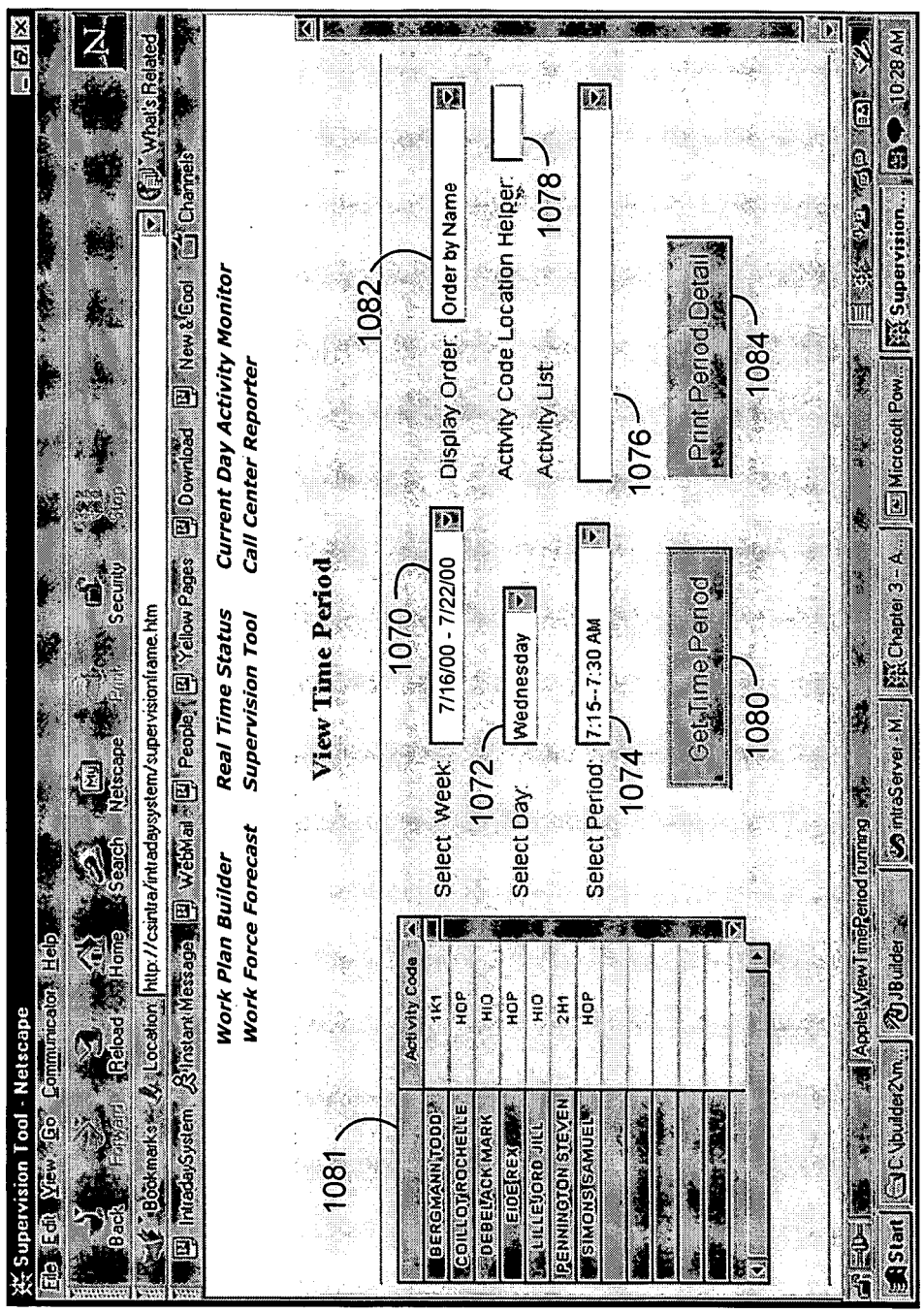

Selecting "View Time Period" from the menu of FIG. 9 causes the screen of FIG. 10F to be displayed. This screen provides a facility to display the names of workers working during a particular time period, along with the activity code identifying the activity in which the worker plans to be engaged. To utilize this facility, the user selects a particular week using combo box 1070 (e.g., Jul. 16, 2000-Jul. 22, 2000), a particular day using drop-down list box 1072 (e.g., Wednesday), and a particular time period using combo box 1074. If desired, the user may further limit the display to those workers performing a particular activity by specifying an activity code using combo box 1076. Activity Code Location Helper edit box 1078 is available to assist the user in finding the right activity code by typing in up to three letters. When the user has specified the desired criteria, he/she clicks on the "Get Time Period" button 1080 to access the work plans stored in the memory of system server 110 and generate a list of workers 1081 that satisfies the specified criteria. The data may be ordered by name or by activity code by making a selection using combo box 1082. A print out of the worker details may be obtained by pressing "Print Period Detail" button 1084.

The three "view" facilities described above (View Work Plan, View Activity, View Time Period) provide a comprehensive mechanism for locating and analyzing the work plans of workers.

Call Center Reporter module 162 is a module for generating reports. These reports are generally after-the-fact reports that compare the forecasted needs and the workers that planned to handle these forecasted needs and the actual needs and the workers that handled these actual needs. The reports may present these comparisons using graphs, numbers, charts, etc. For example, one report might involve comparisons between the forecasted need for telephone coverage and the workers whose work plans called for them to provide this coverage, and the actual need for telephone coverage and the workers who actually did provide coverage. Another report might be an impact report relating to the reallocation of workers because of a surplus or shortage. For example, the report may show the number of hours that were moved off-phone and on-phone. Call Center Reporter module 162 may include standard ("canned") reports that are selectable by users. Call Center reporter module 162 may also provide the capability for users to develop their own reports. For example, a team leader may wish to run a report limited to his/her particular team.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A resource management system comprising:
    a work plan builder module configured to build work plans for workers, said work plan builder module being configured to allow each worker to specify, for each of a plurality of different time periods during each of one or more workdays, one of a plurality of different activities that the worker plans to perform during that time period, wherein said work plan builder module is configured to permit each worker to specify by selection from a displayed list of work activities two or more different work activities that the worker plans to perform during different time periods of the same workday;
    a computer-accessible memory for storing the work plans built by said work plan builder module;
    a forecast module for comparing a service level forecasted to be needed for different work activities and a service level corresponding to the workers that plan to engage in these different work activities as specified in the work plans and permitting changes to the work activities specified in the work plans for one or more workers based on the comparing; and
    a real-time status module for providing real-time statistics regarding activities that the workers are currently engaged in.

2. The resource management system according to claim 1, wherein the different work activities include answering telephone calls, answering electronic mail messages and answering regular mail messages.

3. The resource management system according to claim 2, wherein the plurality of different activities includes vacation time.

4. The resource management system according to claim 3, wherein the work plan builder module is configured to selectively communicate to each worker data indicative of the vacation time remaining for that worker.

5. The resource management system according to claim 2, wherein the plurality of different activities includes sick time.

6. The resource management system according to claim 5, wherein the work plan builder module is configured to selectively communicate to each worker data indicative of the sick time remaining for that worker.

7. The resource management system according to claim 1, wherein the memory is part of a system server computer and the work plan module is a client process executed on a computer located remotely with respect to the system server computer.

8. The resource management system according to claim 1, wherein said work plan builder module is configured to generate and send messages to workers that do not specify a plan by a work plan deadline.

9. The resource management system according to claim 1, further comprising:
    a supervision module configured to access the work plans stored in said memory and to allow review of the work plans by supervisors.

10. The resource management system according to claim 9, wherein the supervision module is configured to communicate data indicative of all workers that plan to perform a particular activity during a particular time period.

11. The resource management system according to claim 9, wherein the supervision module is configured to communicate data indicative of total amounts of time that workers plan to perform particular activities.

12. The resource management system according to claim 1, wherein said forecast module is configured to generate a graphical display indicative of the comparison of the work plans and the forecasted needs.

13. A method of managing resources comprising:
    receiving, using a computer, from each of a plurality of workers a work plan in which the worker specifies, for each of a plurality of different time periods during each of one or more workdays, one of a plurality of different activities that the worker plans to perform during that time period by selecting from a displayed list of work activities, wherein the work plan for at least one of the workers specifies two or more different work activities that the at least one worker plans to perform during different time periods of the same workday;
    storing in a computer-accessible memory the received work plans;
    comparing a service level forecasted to be needed for different work activities and a service level corresponding to the workers that plan to engage in these different work activities as specified in the work plans;
    changing the work activities specified in the work plans for one or more workers based on the comparing; and
    providing real-time statistics regarding activities that the workers are currently engaged in.

14. The resource management system according to claim 1, wherein:

the workers specify activities for the time periods via an interface comprising cells arranged in rows and columns, each cell representing a particular time period for a particular workday.

15. The method according to claim 13, wherein each worker specifies activities for the time periods via an interface comprising cells arranged in rows and columns, each cell representing a particular time period for a particular workday.

16. Non-transitory computer-readable storage having stored thereon one or more computer-executable modules for a resource management system, the one or more computer-executable modules including a work plan builder module for enabling workers to build their own work plans for one or more workdays and a forecast module for comparing a service level forecasted to be needed for different work activities and a service level corresponding to the workers that plan to engage in these different work activities as specified in the work plans, wherein the work plan builder module is configured to allow each worker to specify by selection from a displayed list of work activities two or more different work activities to engage in during different time periods of the same workday and the forecast module permits changes to the work activities specified in the work plans for one or more workers based on the comparing and wherein the one or more computer-executable modules further include a real-time status module for providing real-time statistics regarding activities that the workers are currently engaged in.

17. The computer-readable storage according to claim 16, wherein the work plan builder is configured to allow each worker to further specify vacation time and sick time.

18. The computer-readable storage according to claim 16, wherein the work activities comprise answering telephone calls, answering electronic mail messages and answering regular mail messages.

19. The computer-readable storage according to claim 17, wherein the work plan builder module is configured to selectively communicate to each worker data indicative of the vacation time available for that worker.

20. The computer-readable storage according to claim 17, wherein the work plan builder module is configured to selectively communicate to each worker data indicative of the sick time available for that worker.

21. The computer-readable storage according to claim 16, wherein the work plan builder module enables each worker to generate a default work plan that specifies, for each of a plurality of different time periods during each of one or more workdays, one of a plurality of different activities that the worker plans to engage in during that time period and to generate a new work plan by modifying the default work plan.

22. The computer-readable storage according to claim 16, being configured for remote access by the workers over a communication network.

23. The computer-readable storage according to claim 22, wherein the remote access is via a wireless communication device.

24. The computer-readable storage according to claim 22, wherein the remote access is via a kiosk accessible to a plurality of workers.

25. The computer-readable storage according to claim 22, wherein the remote access is via a hand-held computing device.

26. The computer-readable storage according to claim 16, wherein each worker specifies activities for the time periods via an interface comprising cells arranged in rows and columns, each cell representing a particular time period for a particular workday.

27. The computer-readable storage according to claim 16, wherein the work force forecast module is configured to generate a graphical display indicative of the comparison.

28. The computer-readable storage according to claim 16, wherein the one or more computer-executable modules further include a supervision module for permitting one or more of viewing, updating and approving of the work plans of the workers by a supervisor.

29. The computer-readable storage according to claim 28, wherein the supervision module enables the supervisor to enter work plans for one or more workers.

30. The computer-readable storage according to claim 28, wherein the supervision module is configured to provide one or more displays indicative of all workers that plan to perform a particular activity during a particular time period.

31. The computer-readable storage according to claim 28, wherein the supervision module is configured to provide one or more displays indicative of total amounts of time that each worker plans to perform particular activities.

32. Non-transitory computer-readable storage having stored thereon one or more computer-executable modules for a resource management system, the one or more computer-executable modules including a work plan builder module for enabling workers to build their own work plans for one or more workdays and a forecast module for comparing a service level forecasted to be needed for different work activities and a service level corresponding to the workers that plan to engage in these different work activities as specified in the work plans, wherein the work plan builder module is configured to allow each worker to specify by selection from a displayed list of work activities two or more different work activities to engage in during different time periods of the same workday and the forecast module permits changes to the work activities specified in the work plans for one or more workers based on the comparing and wherein the one or more computer-executable modules further include a current day activity monitor module for providing a real-time comparison between a service level corresponding to current real-time work activities and a service level provided by those workers engaged in these work activities during the current time period.

33. The computer-readable storage according to claim 32, wherein the current day activity module is configured to generate one or more graphical displays indicative of the comparison.

34. The computer-readable storage according to claim 32, wherein the current day activity monitor module is configured to determine when a difference between the service level corresponding to current real-time work activities and the service level provided by those workers engaged in these work activities during the current time period exceeds a predetermined level.

35. The computer-readable storage according to claim 34, wherein the current day activity monitor module is further configured to automatically perform one or more actions if the difference exceeds the predetermined level.

36. The computer-readable storage according to claim 35, wherein the one or more actions includes instructing one or more workers to change the activity in which these workers are currently engaged.

37. A resource management system comprising computer-readable storage according to claim 16.

38. A method of managing resources, comprising:
receiving, using a computer, from each of one or more workers a work plan in which the worker specifies by selecting from a displayed list of work activities a first work activity for a first time period during a workday and a second different work activity for a second different time period during the same workday;

comparing, a service level forecasted to be needed for different work activities and a service level corresponding to the workers that plan to engage in these different work activities as specified in the work plans;

changing the work activities specified in the work plans for one or more workers based on the comparing; and providing real-time statistics regarding activities that the workers are currently engaged in.

39. The method according to claim 38, wherein the work plan is received over a communication network from a computer device configured to provide a display comprising cells arranged in rows and columns, each cell representing a particular time period for a particular workday.

* * * * *